(12) United States Patent
Ueyama et al.

(10) Patent No.: US 6,868,055 B2
(45) Date of Patent: Mar. 15, 2005

(54) OPTICAL PICKUP

(75) Inventors: Tetsuo Ueyama, Nara (JP); Keiji Sakai, Nara (JP); Yukio Kurata, Tenri (JP); Katsushige Masui, Nara (JP); Naotaka Otsuka, Nara (JP); Renzaburo Miki, Nara (JP); Hiroshige Hirajima, Tenri (JP); Noboru Fujita, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 445 days.

(21) Appl. No.: 09/907,880

(22) Filed: Jul. 12, 2001

(65) Prior Publication Data

US 2002/0024916 A1 Feb. 28, 2002

(30) Foreign Application Priority Data

Jul. 13, 2000 (JP) ....................................... 2000-212199
Jun. 12, 2001 (JP) ....................................... 2001-177706

(51) Int. Cl.⁷ ............................................. G11B 7/135
(52) U.S. Cl. ............................. 369/112.15; 369/112.17; 369/112.1; 369/112.04; 369/112.01; 369/112.03
(58) Field of Search .................. 369/112.01, 112.03, 369/112.04, 112.1, 112.12, 112.15, 112.17, 100, 110.02, 112.05, 112.16, 112.07

(56) References Cited

FOREIGN PATENT DOCUMENTS

| EP | 0 936 604 A1 | 8/1999 | | |
|----|--------------|--------|---|---|
| EP | 1 047 051 | 10/2000 | | |
| JP | 09-128794 | 5/1997 | | |
| JP | 11-14828 | 1/1999 | | |
| JP | 11-149652 | 6/1999 | | |
| JP | 2000-076689 | 3/2000 | | |
| JP | 2000076689 A | * | 3/2000 | ......... G11B/07/135 |
| JP | 12-076689/2000 | 3/2000 | | |
| JP | 2000-187880 | 7/2000 | | |
| JP | 2000-353332 | 12/2000 | | |
| JP | 2001-28140 | 1/2001 | | |
| JP | 2001-68779 | 3/2001 | | |
| JP | 2001-68794 | 3/2001 | | |
| JP | 2001-102676 | 4/2001 | | |
| JP | 2001-217500 | 8/2001 | | |
| JP | 2001-291260 | 10/2001 | | |
| KR | 2000-15991 | 3/2000 | | |

OTHER PUBLICATIONS

Korean Patent Office Action and English translation.

* cited by examiner

*Primary Examiner*—Susan McFadden
*Assistant Examiner*—Jorge Leonardo Ortiz-Criado
(74) *Attorney, Agent, or Firm*—David G. Conlin; Steven M. Jensen; Edwards & Angell, LLP

(57) ABSTRACT

An optical pickup can be provided, the optical pickup being capable of recording and playback of a plurality of optical disks having different specs by using light beams of different wavelengths, and further being suitable for integrating the semiconductor lasers and light receiving elements into a single package, by including: first and second semiconductor lasers adjacently disposed; a three-beam diffraction grating for generating three beams for tracking control; a second hologram element for diffracting light of the second semiconductor laser to guide it to a photosensor; a complex polarization beam splitter (PBS) for reflecting only light from the first semiconductor laser; and a first hologram element for diffracting light of the first semiconductor laser to guide it to the photosensor.

37 Claims, 33 Drawing Sheets

F I G. 8
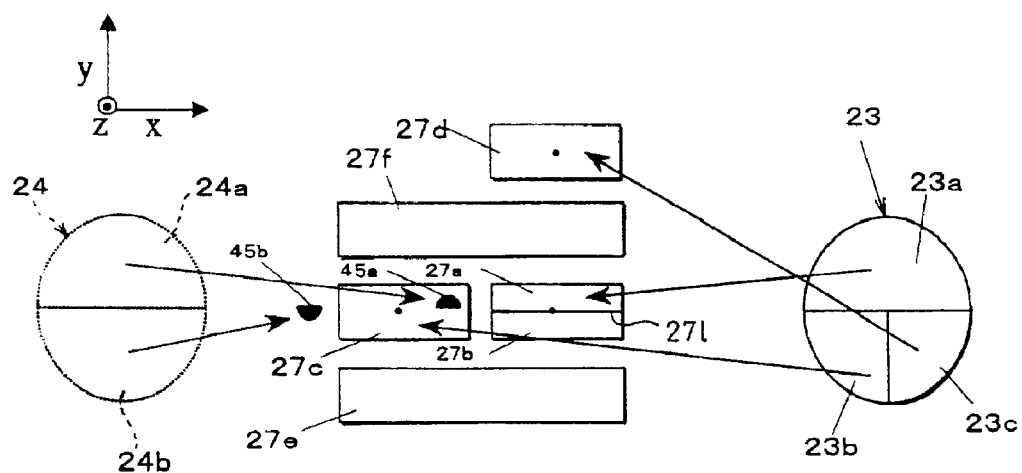
F I G. 9
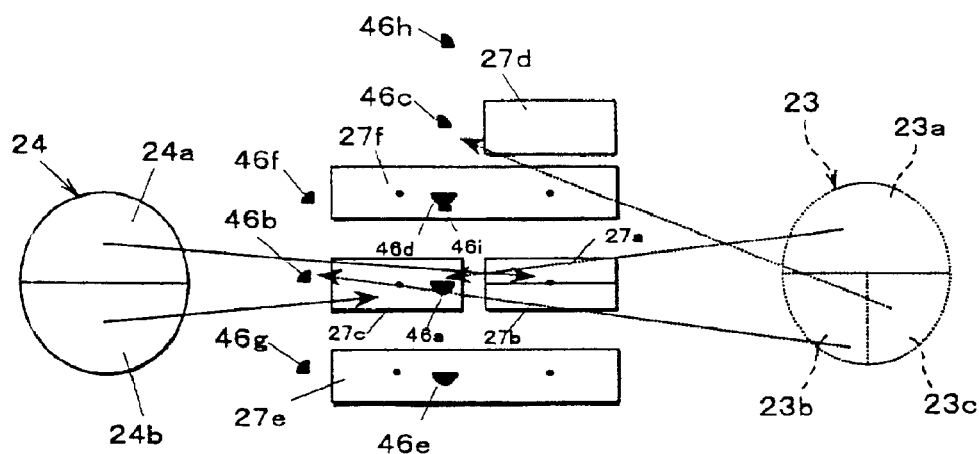

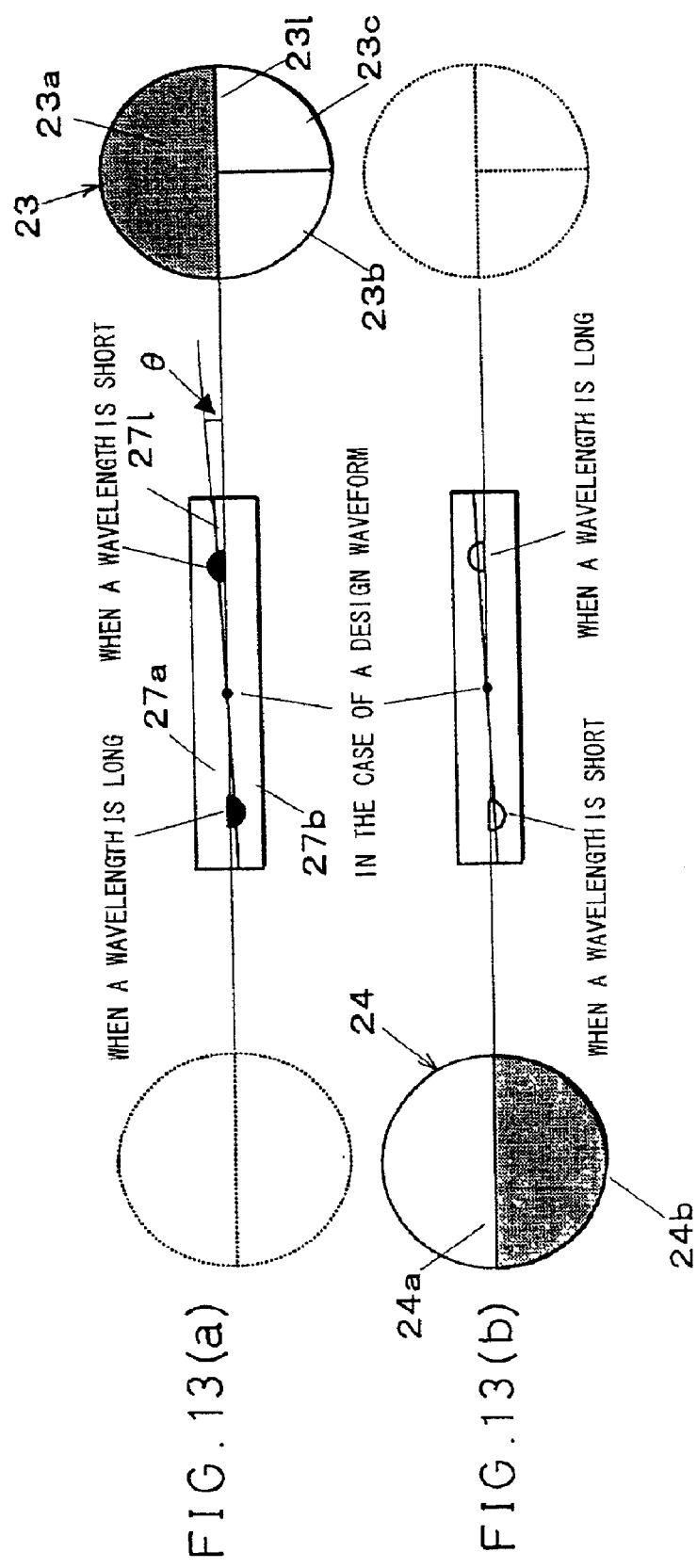

F I G . 16
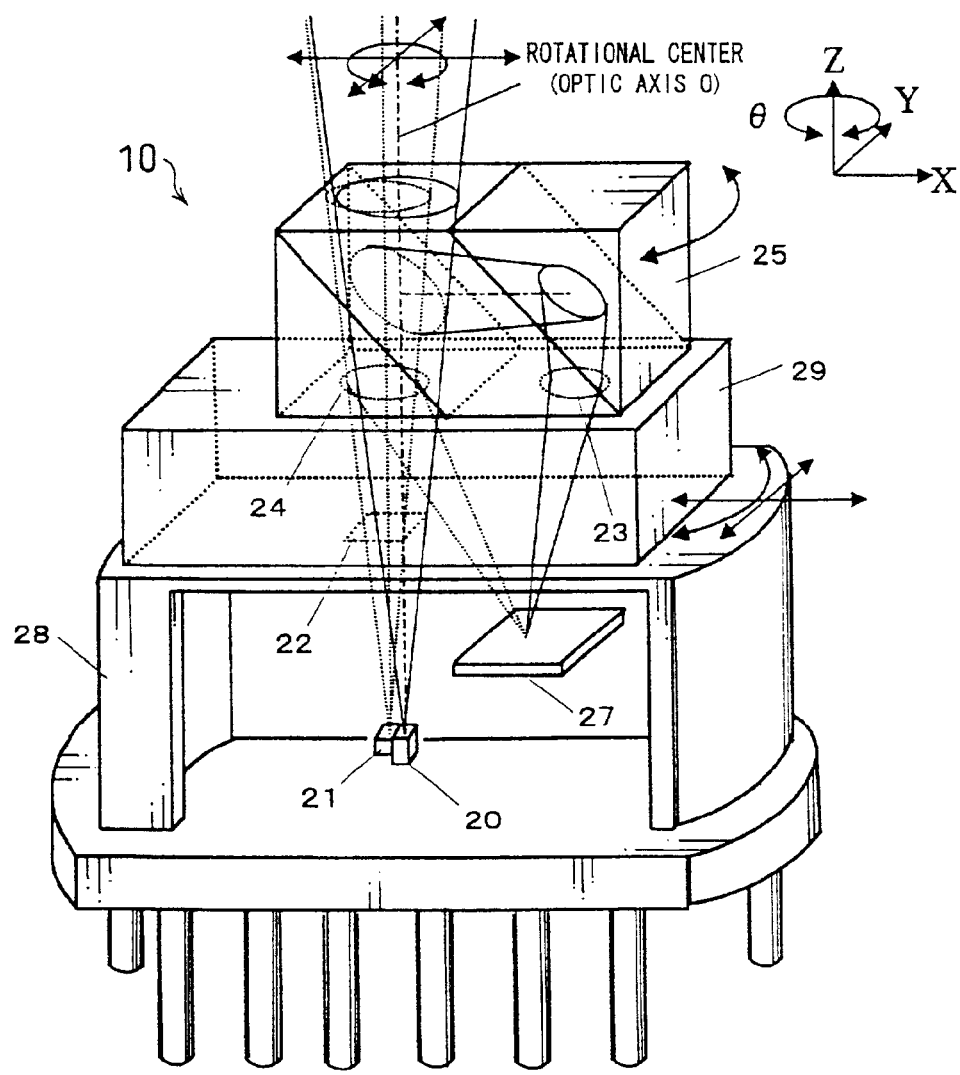

FIG. 19
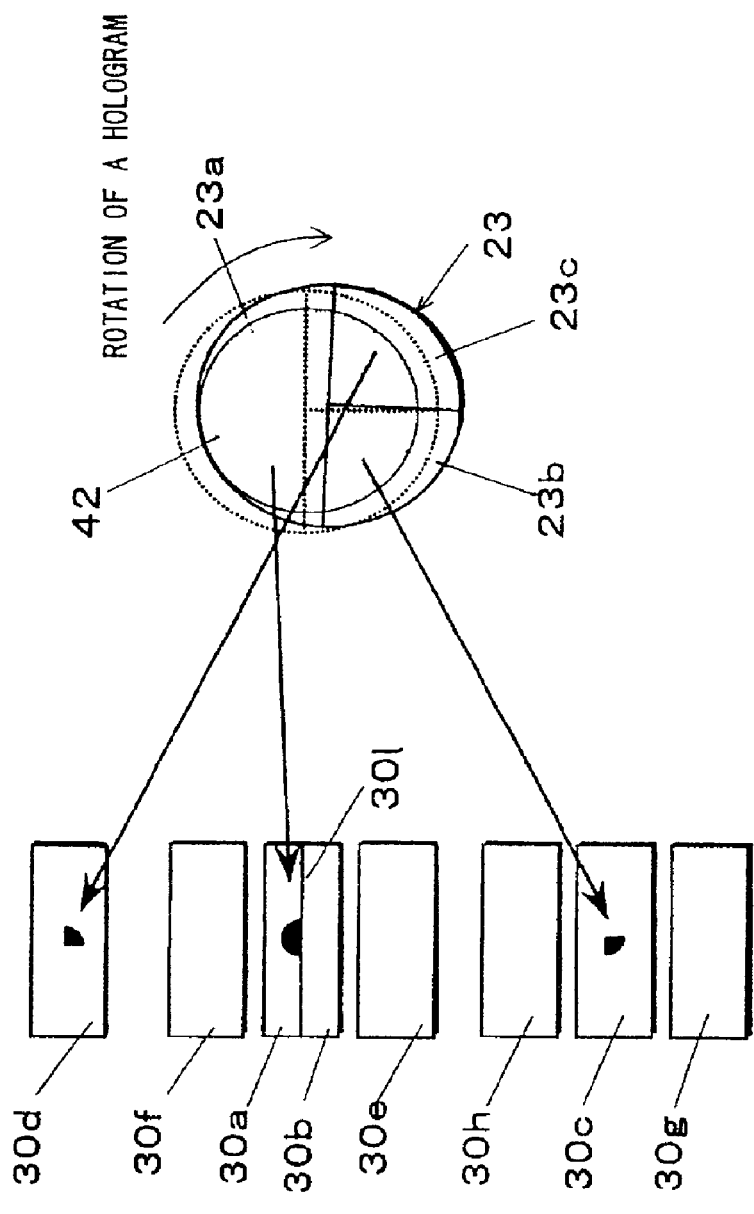
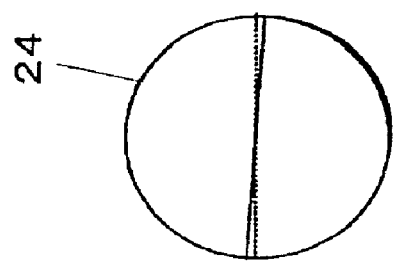
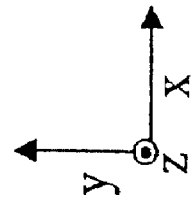

F I G. 33
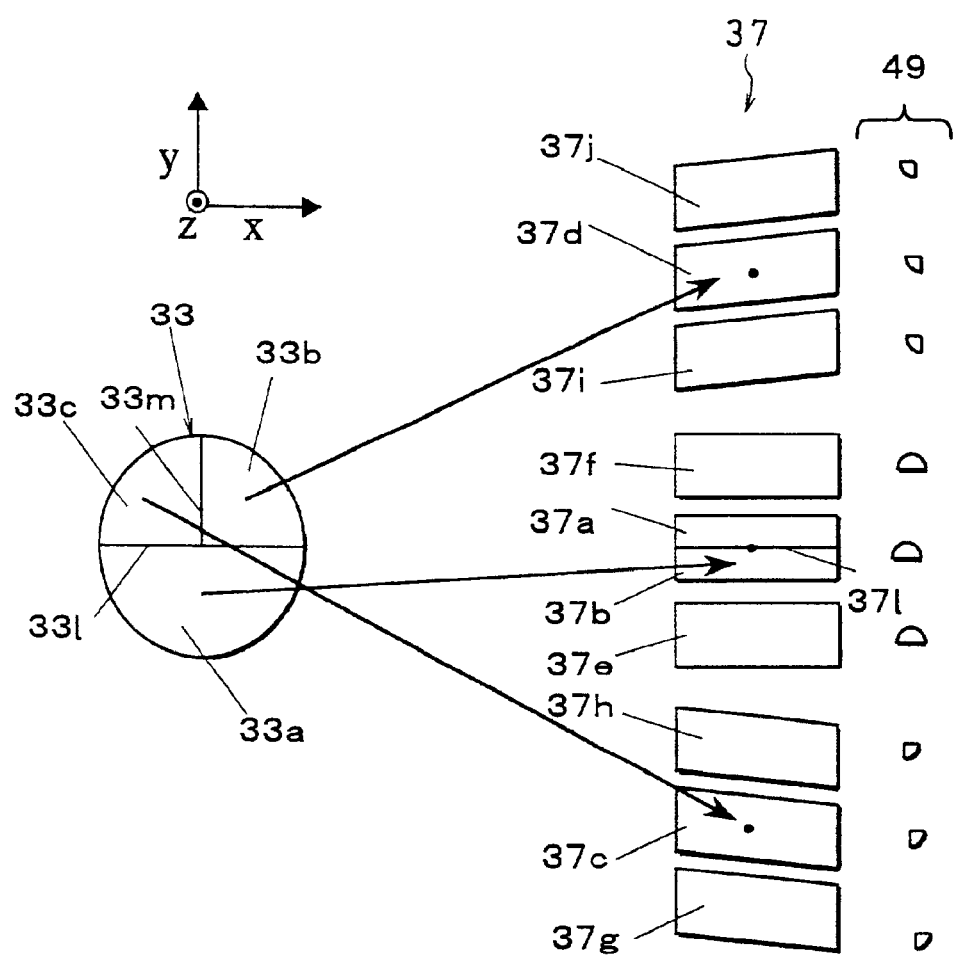

OPTICAL PICKUP

FIELD OF THE INVENTION

The present invention relates to an optical pickup which performs optical recording and reproducing of information with respect to information recording media such as an optical disk and an optical card, and in particular to a compatible optical pickup applicable to a plurality of optical disks of different specifications for performing recording and reproducing using light beams having different wavelengths.

BACKGROUND OF THE INVENTION

In recent years, an optical disk has been utilized in a variety of fields of audios, videos, computers and the like, because of its capability of recording a large quantity of information signals with high density.

Particularly, optical disks having various different specifications (specs) such as CDs, CD-Rs and DVDs have been commercially available. What is required of an optical pickup is compatibility with these disks of the different specs so that a single optical pickup can perform recording or reproducing information of all types of disks.

In the case of CDs and CD-Rs, a substrate and/or a recording medium have characteristics which are optimized for an infrared light beam having a wavelength in the vicinity of 780 nm. Similarly, in the case of DVDs, such characteristics are optimized for a red light beam having a wavelength in the vicinity of 650 nm. Further, a development of a recording or reproducing disk for which the use of a blue light beam of about 400 nm would be available in future has been in progress.

An example of the optical pickup compatible with the disks for thus recording and reproducing using different wavelengths is disclosed in Japanese Unexamined Patent Publication No. 128794/1997 (Tokukaihei 9-128794 published on May 16, 1997), a configuration of which is shown in FIG. 37.

This optical pickup is provided with a first semiconductor laser 1, a second semiconductor laser 2, a three-beam diffraction grating 3, a lattice lens 4, an objective lens 5, a hologram element 7, and a light receiving element 8. The first semiconductor laser 1 starts oscillating when a wavelength of laser light is in a 635 nm band, and the second semiconductor laser 2 starts oscillating when a wavelength of laser light is in a 780 nm band. The three-beam diffraction grating 3 causes a light beam of each light sources to emerge as three beams which are used for tracking control. The lattice lens 4 acts as a concave lens depending on a direction of a polarized wave of the light beam. The hologram element 7 diffracts light reflected from a disk 6, thereby guiding it to the light receiving element 8.

Here, the first and second semiconductor lasers 1 and 2 disposed so that the directions of polarized waves thereof mutually intersect.

First, the following will explain an optical system in the case of using the first semiconductor laser 1 of the 635 nm band to play back an optical disk having a plate thickness of 0.6 mm. Light emitted from the semiconductor laser 1 is separated into three beams by the diffraction grating 3 and transmitted through the hologram element 7, thereafter simply passing through the inactive lattice lens 4 so as to converge on the disk 6 by the objective lens 5.

The light reflected at the disk 6 and returned therefrom is similarly diffracted at the hologram element 7, thereafter being guided to the light receiving element 8. The light beams in the directions of the polarized waves respectively have such lattice patterns as to be acted upon by the lattice lens 4.

Next, the following will explain an optical system in the case of using the second semiconductor laser 2 of the 780 nm band to play back an optical disk having a plate thickness of 1.2 mm.

Light emitted from the semiconductor laser 2 is separated into three beams by the diffraction grating 3 and transmitted through the hologram element 7, thereafter receiving the concave lens action of the lattice lens 4 and converging on the disk 6 by the objective lens 5.

The light reflected at the disk 6 and returned therefrom is similarly diffracted at the hologram element 7, thereafter being guided to the light receiving element 8. The light beams in the directions of the polarized waves respectively have such lattice patterns as to be acted upon by the lattice lens 4.

Note that, it is designed that the concave lens action of the lattice lens 4 corrects spherical aberration which emerges when a disk thickness is in a range of 0.6 mm to 1.2 mm.

In this arrangement, in the case of the first semiconductor laser 1 for example, the hologram element 7 is designed so that the diffraction light of disk reflection light is guided to the light receiving element 8.

Further, in the case of the second semiconductor laser 2 having another wavelength, it is arranged so that a focus point of the disk reflection light on the light receiving element 8, which tends to vary due to different diffraction angles formed by different wavelengths, is kept close at a right position.

Further, both the light from the first semiconductor laser 1 and the light from the second semiconductor laser 2 are respectively separated into three beams by the diffraction grating 3, and the same receiving element 8 detects tracking error signals according to a three-beam method.

With this arrangement, it is possible to commonly use the single light receiving element 8, two of which have been required conventionally, thereby reducing the number of components and the number of steps in the assembly.

In the case of the conventional optical pickup, with regard to semiconductor laser light having a plurality of wavelengths, it is designed that a positional relationship among light sources is set according to a predetermined value, thereby guiding the light to the shared light receiving element by the single hologram element.

However, in the case where laser and the light receiving element are integrated into one package, the laser and the light receiving element are in general fixedly located at a predetermined position, that is, a stem within the package. Therefore, it is often the case that the control of a position and/or rotation is not available for the light receiving element when controlling the hologram element.

Namely, an offset control of a focus error signal and/or tracking error signal for example, which is caused by an error in the mounting of the laser or the light receiving element, form tolerance in a phase on which the hologram element is mounted, or the like, is in most cases performed by the control of the hologram element alone. However, in that case, when optimizing the hologram element for one of semiconductor laser light sources, it is very likely that the same optimum condition becomes ineffectual when using the hologram element with another semiconductor laser light source.

More specifically, controlling only the position of the hologram element in the assembly raises problems such that servo error signals cannot be optimized, or tolerances in the mounting of the laser and the light receiving element, in packaging, and the like are made highly exacting, thereby increasing costs.

Further, the hologram element is often provided with an aberration correction function so as to obtain desirable light converging characteristics on the light receiving element; however, it is difficult to design such a hologram pattern as to perform optimum aberration correction with respect to a plurality of different wavelengths.

Furthermore, the conventional optical pickup has a problem that it is not applicable to a plurality of optical disks of different specs in which different tracking error signals are used, respectively, because only a tracking error signal according to the three-beam method can be detected from either of light beams of the semiconductor laser having a plurality of waveforms.

SUMMARY OF THE INVENTION

It is an object of the present invention to provide an optical pickup which is compatible with a plurality of optical disks of different specs for performing recording and reproducing using light beams of different wavelengths, capable of an easy assembly control, and suitable for downsizing integration.

In order to attain the foregoing object, the optical pickup according to the present invention includes: a first light source for generating a light beam having a first wavelength; a second light source for generating a light beam having a second wavelength different from the first wavelength; a lens system for focusing the two light beams on an optical disk; a photosensor for sensing reflection light beams from the optical disk; an optical path splitting element for splitting optical paths of the two reflection light beams having different wavelengths; and first and second hologram elements for respectively diffracting at least one of the two light beams of the different wavelengths which were split by the optical path splitting element, and guiding the thus diffracted light to the shared photosensor.

With this arrangement, light beams emitted from the first and second light sources and having different wavelengths are focused on the optical disk by the lens system, then, reflected. The optical paths of the respective reflecting light beams are split by the optical path splitting element, thereby travelling through different optical paths. Further, at least one of the reflecting light beams is diffracted at the first and second hologram elements, thereby guiding the both reflecting light beams to the shared photosensor.

For example, the reflecting light beam of the first light source is diffracted at the first hologram element, whereas the reflecting light beam of the second light source is diffracted at the second hologram element, thereby guiding the both diffracted light beams to the shared photosensor through different optical paths. Further, in the case where the reflecting light beams of the first and second light sources are diffracted at the same first hologram element, since the light beams have different wavelengths, and hence different diffraction angles, the diffraction light of either of the first and second light sources is diffracted at the second hologram element, thereby guiding the both reflecting light beams to the shared photosensor through different optical paths.

As explained, the reflecting light including light beams of different wavelengths from the optical disk is split into different optical paths by the optical path splitting element, and the thus split light beams are diffracted at the first and second hologram elements, respectively, thereby guiding the light beams to the shared photosensor. This enables the shared use of the photosensor between the light beams having different wavelengths regardless of the positions of the first and second light sources. Consequently, it is possible to provide an optical pickup which is capable of performing recording or reproducing with respect to the plurality of optical disks having different specs which are recorded and played back by using light beams of different wavelengths, and further being suitable for integrating lasers and light receiving elements into a single package.

The optical pickup preferably has an arrangement in which the optical path splitting element and at least one of the first and second hologram elements are separately provided so that a position of either of the two reflecting light beams can independently be controlled over the photosensor by separately controlling each of the elements.

With this arrangement, when, for example, the optical path splitting element transmits one of the reflecting light beams while reflecting the other, it is possible to correct deviation in the latter reflecting light beam caused by the optical path splitting element by the following control: the hologram elements are first controlled so as to control the position of the former reflecting light beam over the photosensor, then, the hologram elements are fixed, thereafter controlling the optical path splitting element so as to make the foregoing correction of deviation. Consequently, the hologram elements and/or the PBS can be controlled independently with respect to the respective light sources, thereby easily performing optimum assembly control with respect to light from the all light sources. This realizes milder tolerances in the mounting of the lasers and the light receiving elements and in the packaging process, thereby greatly reducing costs.

The foregoing optical pickup preferably has an arrangement in which the first hologram element is used to detect a tracking error signal according to a phase difference method or a push-pull method, and the second hologram element is used to detect a tracking error signal according to a three-beam method or a differential push-pull method. With this arrangement, it is possible to detect any of different tracking error signals obtained by the foregoing tracking methods without changing the forms of the light receiving elements.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 is a diagram for an explanation of emergence of stray light in the second hologram element.

FIG. 9 is a diagram for an explanation of emergence of stray light in the first hologram element.

FIGS. 13(a) and 13(b) are explanatory views showing other division patterns in the hologram elements and the light receiving element for correcting an adverse effect of variations in wavelength of diffraction light.

FIG. 16 is a diagram for an explanation of a method for controlling an integrated unit.

FIG. 19 is a diagram for an explanation of control of a complex prism.

FIG. 33 is an explanatory view showing division patterns and light converging states in the hologram element and the light receiving element.

DESCRIPTION OF THE EMBODIMENTS

The following will explain in detail a First Embodiment of the present invention with reference to FIGS. 1 through 20. Note that, components identical with those shown in the conventional example above will be given the same reference symbols, and explanation thereof will be omitted here.

Figure 1:
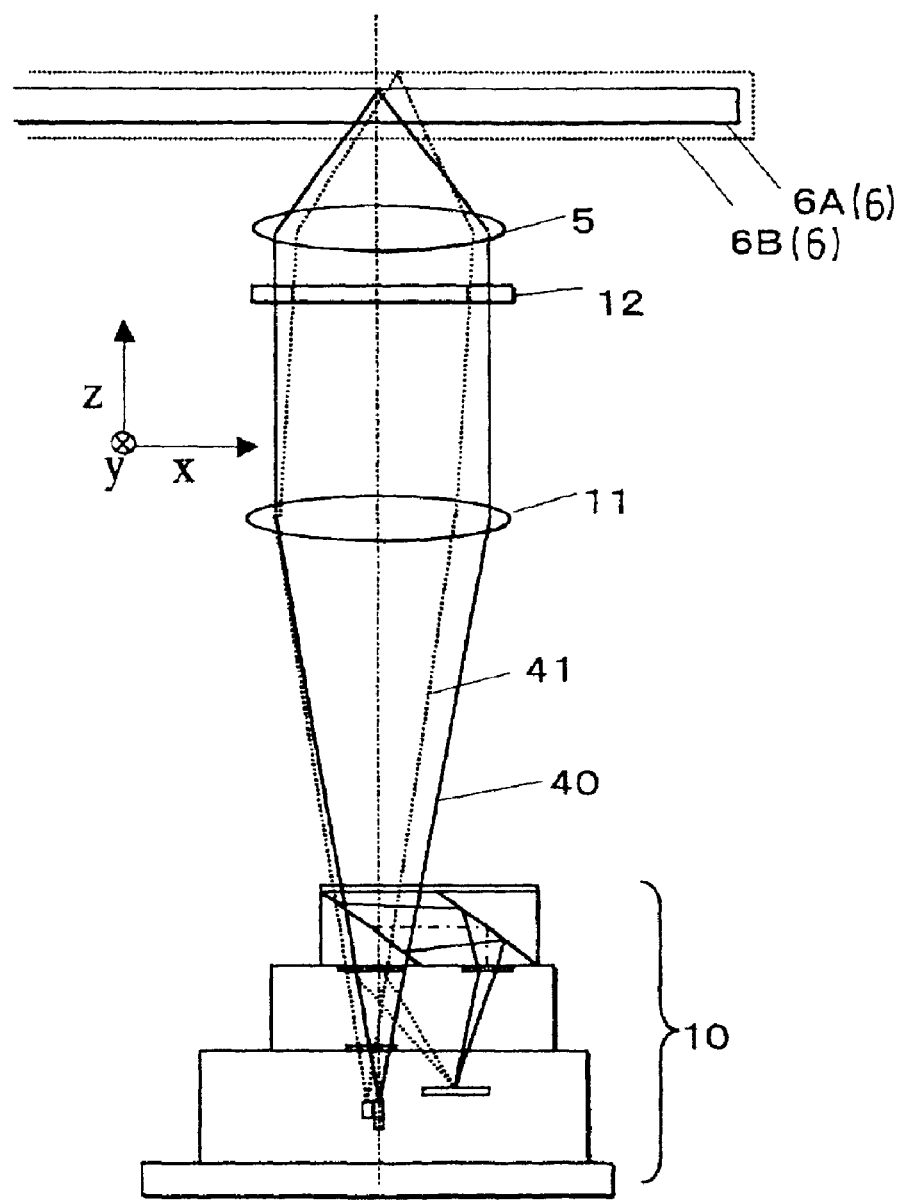
FIG. 1 is a schematic diagram showing an optical system according to a First Embodiment of an optical pickup of the present invention.
Figure 2:
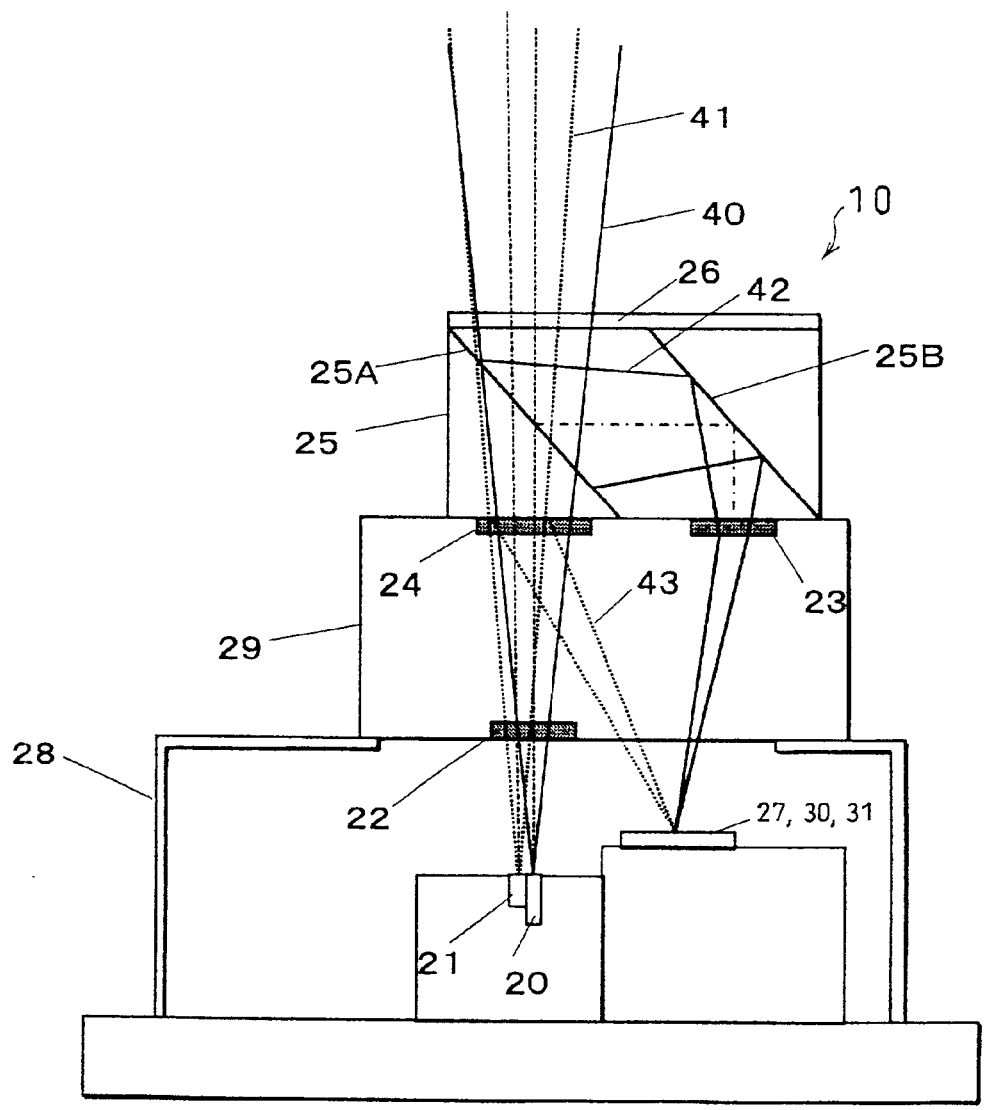
FIG. 2 is a front view showing a configuration of an integrated laser unit according to the First Embodiment of the optical pickup of the present invention.

FIGS. 1 and 2 are schematic diagrams of an optical pickup according to the present embodiment. Light emitted from an integrated laser unit 10 is changed into parallel light at a collimator lens 11 and transmitted through a wavelength selecting aperture 12, thereafter being focused on an optical disk 6 by an objective lens 5. The reflection light from the optical disk 6 travels through same optical components as those of an outward travel so as to be focused on a photosensor 27 of the integrated laser unit 10.

Details of the integrated laser unit 10 will be discussed with reference to FIG. 2. The integrated laser unit 10 includes a first semiconductor laser 20 which starts oscillating when a wavelength of laser light is in a 650 nm band, and a second semiconductor laser 21 which starts oscillating when a wavelength of laser light is in a 780 nm band, which are adjacently disposed.

Further, the integrated laser unit 10 is provided with a three-beam diffraction grating 22, a first hologram element 23, a second hologram element 24, a complex polarization beam splitter (complex PBS) 25, a wave plate 26, and the photosensor 27, 30 or 31. The three-beam diffraction grating 22 causes emergence of three beams for tracking control. The first hologram element 23 diffracts a light beam of the first semiconductor laser 20 and guides the diffracted light beam to a light receiving element 27, and the second hologram element 24 diffracts a light beam of the semiconductor laser 21 and guides the diffracted light beam to the light receiving element 27. The complex PBS 25 has a polarization beam splitter surface 25A and a reflector surface 25B.

Here, the first semiconductor laser 20, the second semiconductor laser 21 and the light receiving element 27 are mounted inside a laser package 28. The diffraction grating 22 and the first and second hologram elements 23 and 24 are respectively formed on the front and back of a transparent substrate 29. The transparent substrate 29, the complex PBS 25 and the wave plate 26 are integrally and fixedly bonded to the laser package 28, thereby composing the integrated laser unit 10.

As the light sources of the optical pickup, the first semiconductor laser 20 and the second semiconductor laser 21 are mounted. The structures of chips thereof include a 'hybrid type', a 'monolithic type', etc. The 'hybrid type' is a structure in which two types of differently formed laser chips are fixed by thermal fusion, examples of which are the horizontal placement of FIG. 3(a) and the vertical stacking of FIG. 3(b). The 'monolithic type' is a structure in which two types of laser chips are formed on the same substrate by repeating crystal growth twice in a direction of an active layer shown in FIG. 3(c) and in a direction perpendicular to the active layer shown in FIG. 3(d).

Generally, the 'hybrid type' fabricates a laser chip individually. Therefore, it is capable of combining laser chips having various characteristics and waveforms, and can manage chip yields individually, thereby improving yields of the entirety of a dual-wave laser. However, the 'hybrid type' has a problem such that errors in an interval between, and in positions of, light emitting points may increase depending on a tolerance at the time of fixedly setting the chip.

In comparison, the 'monolithic type' is combined with the limited types of lasers, and has inferior yields. However, since two laser elements are formed on the same substrate, only errors related to a semiconductor process may occur, thereby making it possible to very closely set tolerances in positions of, and an interval between, the two laser elements.

Figure 3A:
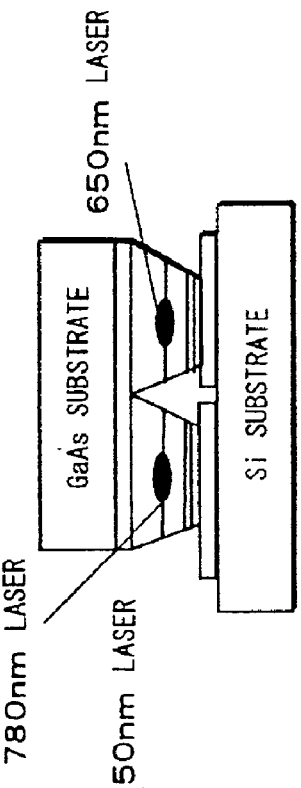
FIGS. 3(*a*) to 3(*d*) are explanatory views showing structures of a dual-wave semiconductor laser element.
Figure 3B:
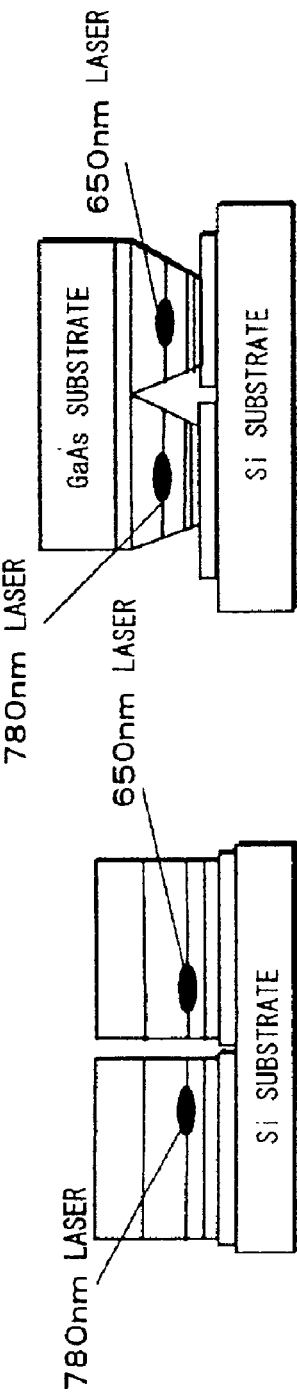
Figure 3C:
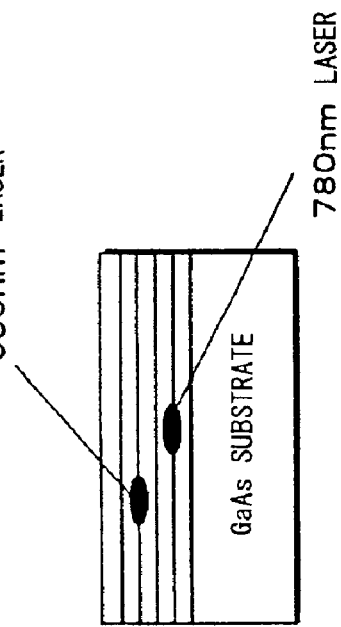

Further, as shown in FIGS. 3(a) and 3(c), when the light emitting points are aligned side by side in the direction of the active layer, such fabrication is easy, but an interval between the light emitting points increases to an extent of 100 $\mu$m to 200 $\mu$m. This arises a problem such that an optic axis largely deviates from its right position when the semiconductor laser chips thus fabricated are mounted on the pickup.

Figure 3D:
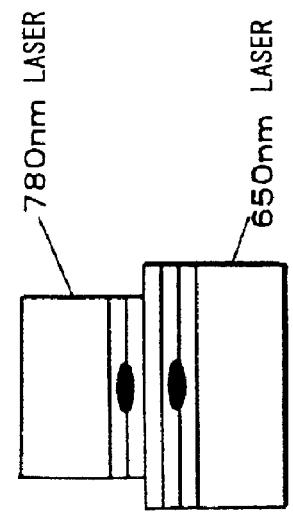

On the other hand, as shown in FIGS. 3(b) and 3(d), when the light emitting points are aligned in the direction perpendicular to the active layer, such fabrication is difficult, but an interval between the light emitting points can greatly be reduced to an extent of a few $\mu$m to 20 $\mu$m.

The optical pickup according to the present embodiment has an arrangement capable of controlling a sensing optical system individually with respect to each wavelength. Therefore, regardless of whether an interval between the light emitting points and an error therein as explained referring to FIGS. 3(a) to 3(d) are large or small, the light sources having various chip structures can be utilized.

Next, the following will explain in detail a method for reproducing information of different optical disks. For example, when playing back a DVD having a plate thickness of 0.6 mm, a light beam 40 emitted from the first semiconductor laser 20 of the 650 nm band shown in FIGS. 3(a) to 3(d) is transmitted through the diffraction grating 22, the second hologram element 24, the polarization beam splitter surface 25A of the complex PBS 25, and the wave plate 26, and is changed into parallel light by the collimator lens 11, thereafter being transmitted through the wavelength selecting aperture 12 and focused on an optical disk 6A having the plate thickness of 0.6 mm by the objective lens 5.

Further, returning light is transmitted through the objective lens 5, the wavelength selecting aperture 12 and the collimator lens 11, and reflected at the polarization beam splitter surface 25A and the reflector surface 25B, thereafter being diffracted at the first hologram element 23 and focused on the photosensor 27.

Further, when playing back a CD having a plate thickness of 1.2 mm, a light beam 41 emitted from the second semiconductor laser 21 of the 780 nm band is split into three beams by the diffraction grating 22, and transmitted through the second hologram element 24, the polarization beam splitter surface 25A of the complex PBS 25, and the wave plate 26, and is changed into parallel light by the collimator lens 11, thereafter being given an aperture limit by the wavelength selecting aperture 12 and focused on an optical disk 6B having the plate thickness of 1.2 mm by the objective lens 5.

Further, returning light is transmitted through the objective lens 5, the wavelength selecting aperture 12, the collimator lens 11 and the polarization beam splitter surface 25A, and diffracted at the second hologram element 24, then, focused on the photosensor 27.

The wavelength selecting aperture 12 has a wavelength selecting film which allows transmission of, for example, the light of 650 nm. However, with respect to the light of 780 nm, it limits an aperture so that an NA of the objective lens 5 becomes 0.45.

Further, as to the objective lens 5, basically with respect to the light having a wavelength of the 650 nm band and a NA 0.6, it takes an aspherical form such that an aberration is sufficiently reduced when the plate thickness is 0.6 mm. However, in the case of the light having a wavelength of a 780 nm band, the objective lens 5 partially corrects its form with respect to a light beam in a region in the vicinity of a NA 0.45, where an aberration is large, so that the light is focused on an optical disk having a plate thickness of 1.2 mm.

Accordingly, the objective lens 5 is designed so that the aberration is sufficiently reduced with respect to respective light beams from two different laser chips.

Next, the following will explain a relationship between a polarization direction and the complex PBS. One characteristic thereof will be discussed. For example, the PBS surface 25A has a polarization characteristic that it transmits almost 100% of P polarized light and reflects almost 100% of S polarized light with respect to both light having a wavelength of the 650 nm band from the first semiconductor laser 20 and light having a wavelength of the 780 nm band from the second semiconductor laser 21.

Further, the wave plate 26 is fixedly bonded to an upper surface of the complex PBS 25 and set to have a thickness which generates a phase difference to act as a ¼ wave plate with respect to the wavelength of the 650 nm band of the first semiconductor laser 20, and as a ½ wave plate with respect to the wavelength of the 780 nm band of the second semiconductor laser 21.

When playing a DVD back, light (linearly polarized light in an x direction in FIG. 1) which is the P polarized light emitted from the first semiconductor laser 20 is transmitted through the PBS surface 25A and changed into circularly polarized light at the ¼ wave plate 26, thereafter being incident onto the optical disk 6A.

Returning light is incident again onto the ¼ wave plate 26, and changed into linearly polarized light in a y direction (S polarized light) so as to be reflected at the PBS surface 25A and the reflector surface 25B. The reflected light is then incident onto the first hologram element 23 and focused on the photosensor 27.

Consequently, since all the returning light from the optical disk 6A can be guided to the photosensor, optical utilization efficiency can be improved greatly.

Further, when playing a CD back, light (linearly polarized light in the x direction in FIG. 1) which is the P polarized light emitted from the second semiconductor laser 21, similarly, is transmitted through the PBS surface 25A and changed into S polarized light (linearly polarized light in the y direction in FIG. 1) at the ½ wave plate 26, thereafter being incident onto an optical disk 6B.

Returning light is incident again onto the ½ wave plate 26 and restored to the original P polarized light (linearly polarized light in the x direction in FIG. 1), then, transmitted through the PBS surface 25A so as to be incident onto the second hologram element 24. Thereafter, the incident light is partially diffracted and focused on the photosensor 27.

Further, another characteristic of the relationship between the polarization direction and the complex PBS will be discussed. For example, the PBS surface 25A has a polarization characteristic as follows: with respect to the light having the wavelength of the 650 nm band from the first semiconductor laser 20, the PBS surface 25A transmits almost 100% of P polarized light and reflects almost 100% of S polarized light; and with respect to the light having the wavelength of the 780 nm band from the second semiconductor laser 21, the PBS surface 25A transmits almost 100% of both the P and S polarized light.

Further, the wave plate 26 is set to have a thickness which generates a phase difference to act as the ¼ wave plate with respect to the wavelength of the 650 nm band of the first semiconductor laser 20. A phase difference is arbitrary with respect to the wavelength of the 780 nm band of the second semiconductor laser 21.

For example, when playing a DVD back, P polarized light (linearly polarized light in the x direction in FIG. 1) emitted from the first semiconductor laser 20 is transmitted through the PBS surface 25A and changed into circularly polarized light at the ¼ wave plate 26, thereafter being incident onto the optical disk 6A.

Returning light is incident again onto the ¼ wave plate 26 and changed into linearly polarized light in the y direction (S polarized light), then, reflected at the PBS surface 25A and the reflector surface 25B. The reflected light is then incident onto the first hologram element 23, thereafter being focused on the photosensor 27.

Accordingly, since all the returning light from the optical disk 6A can be guided to the photosensor, optical utilization efficiency can be improved greatly.

Further, when playing a CD back, P polarized light (linearly polarized light in the x direction in FIG. 1) emitted from the second semiconductor laser 21, similarly, is transmitted through the PBS surface 25A and changed into elliptically polarized light (because of an arbitrary phase difference) at the wave plate 26, thereafter being incident onto the optical disk 6B.

Returning light is incident again onto the wave plate 26 and changes its polarization state. However, the PBS surface 25A transmits the light of any wavelength emitted from the second semiconductor laser 21, and all the returning light can thereby be incident onto the second hologram element 24. The incident light is then partially diffracted and focused on the photosensor 27.

In the integrated laser unit 10 according to the present embodiment, both of the two different characteristics of the relationship between the polarization direction and the complex PBS can be utilized.

Next, the following will explain the structures and characteristics (wavelength selectivity) of the diffraction grating 22, and the first and second hologram elements 23 and 24. The diffraction efficiency of a rectangular hologram will be shown in FIGS. 4 and 5.

The diffraction efficiency of the rectangular hologram having the same groove width and the land width can be given as follows:

when t is a groove depth, λ is a wavelength, and n is a refractive index of the transparent substrate, 0th order diffraction efficiency (transmissivity) $\eta_0 = (\cos \Delta\phi)^2$ ±1st order diffraction efficiency $\eta_1 = (2/\pi \times \sin \Delta\phi)^2$ therefore, $\Delta\phi = \pi t(n-1)/\lambda$.

Figure 4:
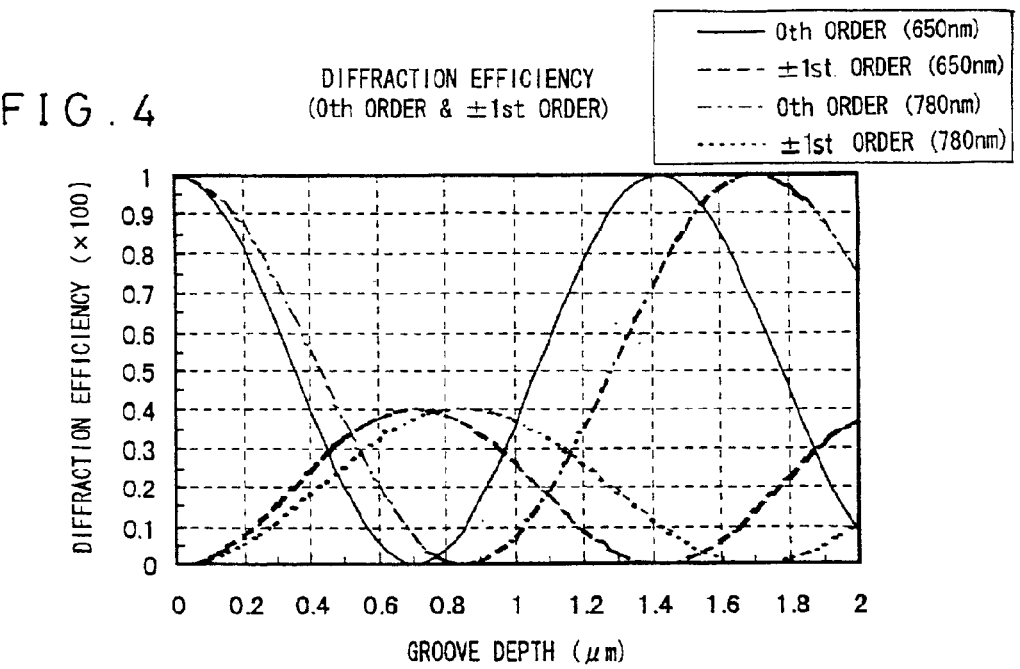
FIG. 4 is an explanatory view showing a relationship between a groove depth and diffraction efficiency of a hologram.
Figure 5:
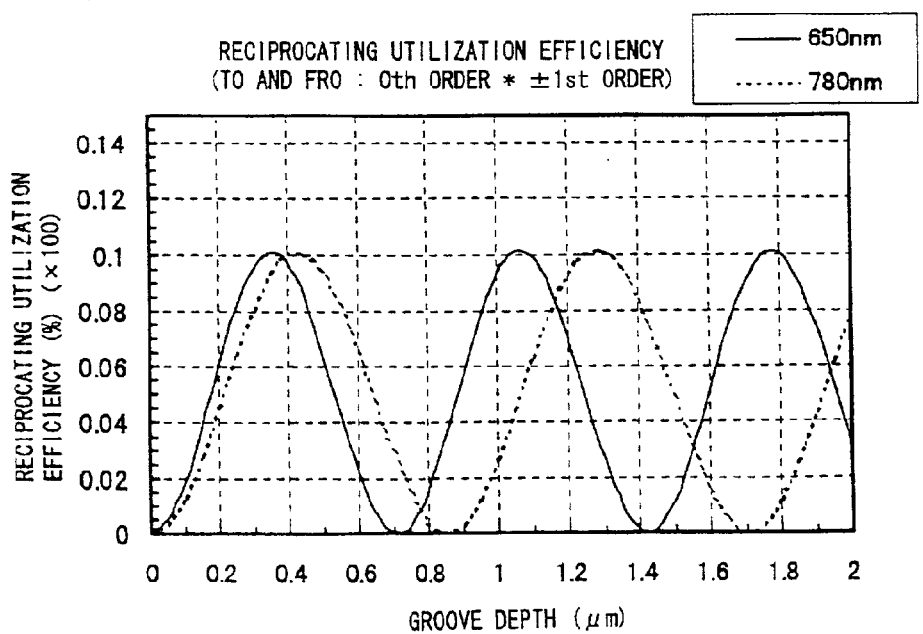
FIG. 5 is an explanatory view showing a relationship between a groove depth and reciprocating utilization efficiency of a hologram.
Figure 6:
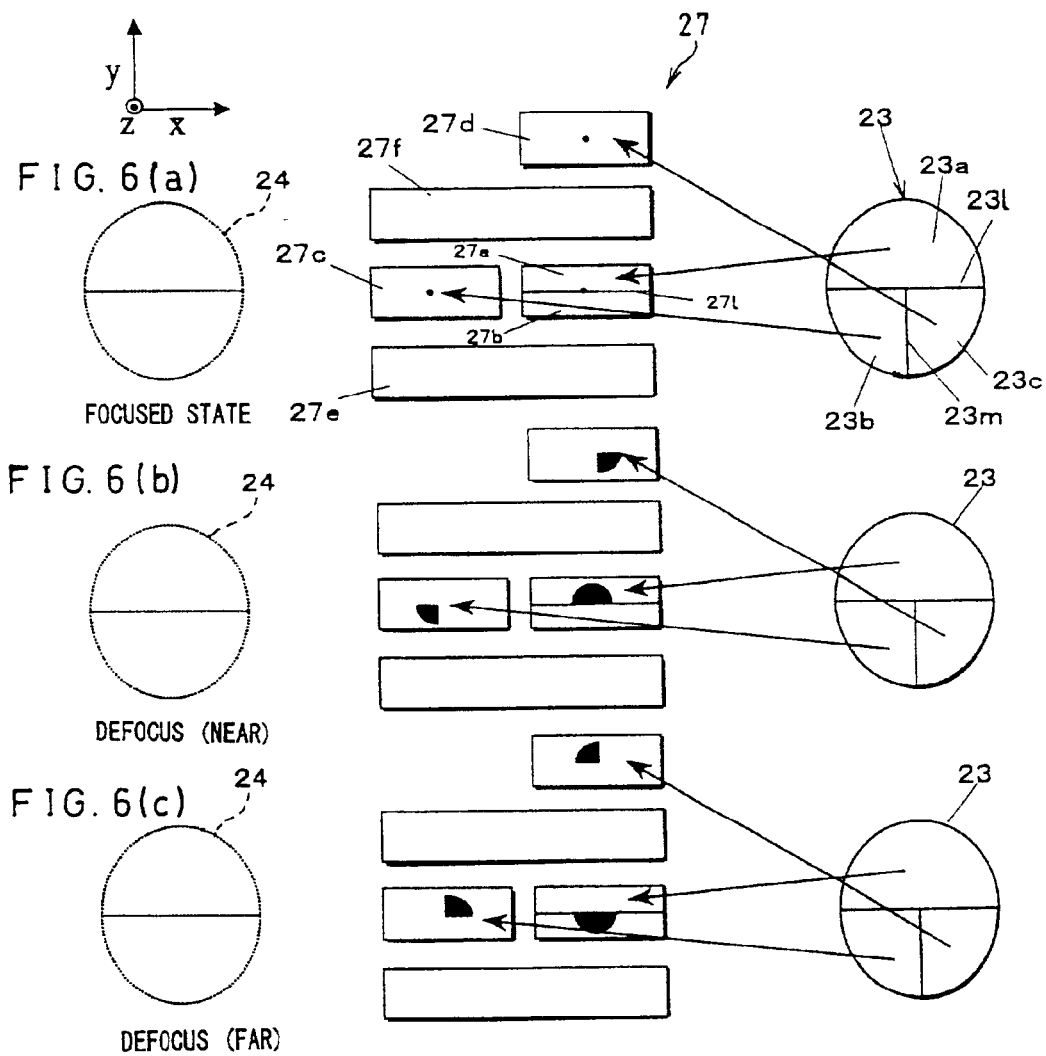
FIGS. 6(a) to 6(c) are explanatory views showing division patterns in a first hologram element and a light receiving element, respectively.

FIG. 4 shows a relationship between 0th/±1st order diffraction efficiency and a groove depth when wavelengths are 650 nm and 780 nm. Further, FIG. 5 shows a relationship between the product of 0th order diffraction efficiency and ±1st order diffraction efficiency (reciprocating utilization efficiency) and a groove depth. Here, assume that hologram glass is a quartz having n=1.457 (λ=650 nm), and n=1.454 (λ=780 nm).

The three-beam diffraction grating 22 having a groove depth of about 1.4 μm will be discussed referring to FIG. 4. For example, when quartz glass is adopted, with respect to the light having the wavelength of the 780 nm band, a main beam (0th order transmissivity) is 72%, and a sub-beam (±1st order diffraction efficiency) is 12%, thereby obtaining a ratio of light quantities of three beams, which is sub:main:sub=1:6:1.

In addition, here, with respect to the light having the wavelength of the 650 nm band, the diffraction efficiency of ±1st order light is substantially 0, thereby being scarcely affective.

The second hologram element 24 requires to secure a quantity of light incident onto the photosensor 27 with respect to the light having the wavelength of the 780 nm band. Likewise, with respect to the light having the wavelength of the 650 nm band, the second hologram element 24 is required to secure a quantity of light incident onto the optical disk 6, thereby setting a groove depth at about 0.35 μm.

As shown in FIGS. 4 and 5, with respect to the light having the wavelength of the 780 nm band, 0th order is 65%, ±1st order is 14%, and reciprocating utilization efficiency is about 9%, thereby securing a value of maximum efficiency in the vicinity of 10%. In that case, with respect to the light having the wavelength of the 650 nm band, 0th order transmission decreases to about 50%.

Since only the light having the wavelength of the 650 nm band is incident onto the first hologram element 23, in order to secure as large a quantity of light incident onto the photosensor 27 as possible, as shown in FIG. 4, a groove depth is set at about 0.7 μm, thereby attaining ±1st order diffraction efficiency of about 40%.

Note that, with regard to the light having the wavelength of the 650 nm band from the first semiconductor laser 20, it is reduced to about 50% by the second hologram element 24 when travelling outward. However, returning light from the optical disk 6 is diffracted by 40% at the first hologram element 23. Therefore, reciprocating utilization efficiency is about 20% in its product, thereby attaining higher efficiency than the maximum reciprocating utilization efficiency of 10% shown in FIG. 5.

Next, the following will explain the structures of the first hologram element 23, the second hologram element 24 and the photosensor 27, and a servo signal detecting method. FIGS. 6(a) to 6(c) show the first hologram element 23 and the form of the light receiving element of the photosensor 27.

As shown in FIG. 6(a), the hologram element 23 is split into three regions 23a to 23c by a split line 23l in the x direction corresponding to a direction of the radius (hereinafter, "radial direction") of the optical disk 6, and by a split line 23m in the y direction corresponding to a direction of a track (hereinafter, "track direction") of the optical disk 6.

The light receiving element is made up of a 2-division light receiving element, one half of which is a light receiving region 27a and the other a light receiving region 27b divided by a division line 27l, and four light receiving regions 27c to 27f (here, respective output from the light receiving regions are referred to as Sa to Sf).

For example, when playing a DVD back, returning light from the optical disk 6A which is originally emitted from the first semiconductor laser 20 is incident onto the first hologram element 23.

When a light beam is focused by the objective lens 5 on an information recording side of the optical disk 6A, one of all incident beams which was diffracted at a region 23 of the hologram element 23 is focused on the division line 27l dividing the light receiving element into halves 27a and 27b. Diffraction light in a region 23b of the hologram element 23 is focused on the light receiving region 27c. Likewise, diffraction light in a region 23c of the hologram element 23 is focused on the light receiving region 27d.

When the optical disk 6A and the objective lens 5 approach each other, a resultant state is as shown in FIG. 6(b). On the other hand, when they depart from each other, a resultant state is as shown in FIG. 6(c). Therefore, using the respective output Sa and Sb from the light receiving regions 27a and 27b, it is possible to detect a focus error signal (FES) according to a single knife edge method by FES=Sa−Sb.

Further, when playing back the optical disk 6A storing pit information, a change in a signal phase difference between the respective output Sc and Sd from the light receiving regions 27c and 27d is detected first, thereby detecting a tracking error signal 1 (TES1) according to a phase difference (DPD) method.

In the case of the optical disk 6A having grooves formed therein, it is possible to detect a tracking error signal 2 (TES2) according to a push-pull method by TES2=Sc−Sd.

In addition, a stored information signal (RF signal) can be reproduced by RF=Sa+Sb+Sc+Sd.

Figure 7:
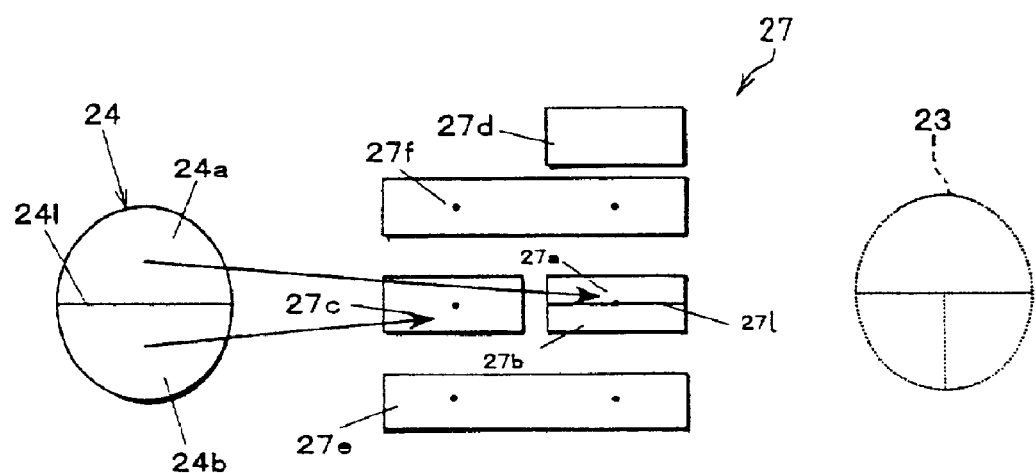
FIG. 7 is an explanatory view showing division patterns in a second hologram element and the light receiving element, respectively.

Next, the following will explain the second hologram element 24 and the light receiving element of the photosensor 27 with reference to FIG. 7. As shown in FIG. 7, the hologram element 24 is split into two regions 24a and 24b by a split line 24l in the x direction corresponding to the radial direction of the optical disk. Here, the light receiving element is the same as the aforesaid photosensor 27.

When playing a CD back, returning light from the optical disk 6B which is originally emitted from the second semiconductor laser 21 is incident onto the second hologram element 24.

When a light beam is focused by the objective lens 5 on an information recording side of the optical disk 6B, one of all incident beams which was diffracted at a region 24 of the second hologram element 24 is focused on the division line 27l dividing the light receiving element into halves 27a and 27b, and light diffracted at a region 24b of the second hologram element 24 is focused on the light receiving region 27c.

The light of the semiconductor laser 21 is split into a main beam and two sub-beams A and B by the three-beam diffraction grating 22. Therefore, the sub-beam A diffracted at the regions 24a and 24b of the second hologram element 24 is focused on the light receiving region 27f, while the sub-beam B diffracted at the regions 24a and 24b of the second hologram element 24 is focused on the light receiving region 27e.

A focus error signal (FES), as with the DVD, can be detected by FES=Sa−Sb.

Further, a stored information signal (RF signal) can be reproduced by RF=Sa+Sb+Sc.

By thus using the partially shared light receiving element for the different optical disks 6A and 6B, a servo signal and an RF signal can be detected.

Next, the following will explain a pattern of another light receiving element. FIGS. 8 and 9 show the problem of stray light that may possibly emerge with respect to light receiving elements 7a to 7f.

The optical pickup according to the present embodiment as described referring to FIG. 2 can, in principle, completely separate optical paths of light from the two laser-light sources of different waveforms at the PBS. However, depending on a tolerance and/or variations in wavelength with regard to separating film characteristics and wave plate characteristics of the PBS, light which failed to be separated at the PBS and leaks in a different optical path, i.e., so-called 'stray light' may possibly emerge.

FIG. 8 shows stray light which is incident from the second hologram element 24 when the first hologram element 23 is used to detect a signal.

As with FIG. 6(a), light diffracted at the region 23a of the hologram element 23 is focused on the division line 27l dividing the light receiving element into halves 27a and 27b, and light diffracted at the regions 23b and 23c of the hologram element 23 are respectively focused on the light receiving regions 27c and 27d. However, part of the light transmitted through the PBS surface 25A shown in FIG. 2 is diffracted at the second hologram element 24, thereby generating diffraction light 45a and 45b in the regions 24a and 24b, respectively.

The second hologram element 24 is designed for the light having the wavelength of the 780 nm band. Therefore, with respect to the light having the wavelength of the 650 nm band, its diffraction angle becomes smaller than a designed angle, and the light is focused on a position closer to a hologram than the expected position.

For example, when it is designed so that the diffraction light 45a deviates off the light receiving regions 27a and 27b, as shown in FIG. 8, the diffraction light 45a is incident onto the light receiving region 27c, thereby possibly causing adverse effects such as noise and offset.

Further, FIG. 9 shows stray light incident from the first hologram element 23 in the case of detecting a signal in the second hologram element 24.

As with FIG. 7, when a main beam and sub-beams A and B from the regions 24a and 24b of the second hologram element 24 are focused on the primarily expected position, part of light reflected at the PBS surface 25A in FIG. 2 is diffracted at the first hologram element 23, thereby generating diffraction light beams 46a to 46i in the regions 23a to 23c of the first hologram element 23.

The first hologram element 23 is designed for the light having the wavelength of the 650 nm band. Therefore, with respect to the light having the wavelength of the 780 nm band, its diffraction angle becomes larger than a designed angle, and the light is focused on a position more distant from a hologram than the expected position. In addition, since the light is split into three beams by the diffraction grating 22 shown in FIG. 2, stray light is generated from the sub-beams.

For example, when it is designed so that the diffraction light 46a and 46c deviate off the light receiving regions 27a, 27b and 27d, as shown in FIG. 9, diffraction light beams 46e, 46d and 46i are respectively incident onto the light receiving region 27c which senses the main beam, and the light receiving regions 27e and 27f which sense the sub-beams, thereby possibly causing adverse effects.

Figure 10:
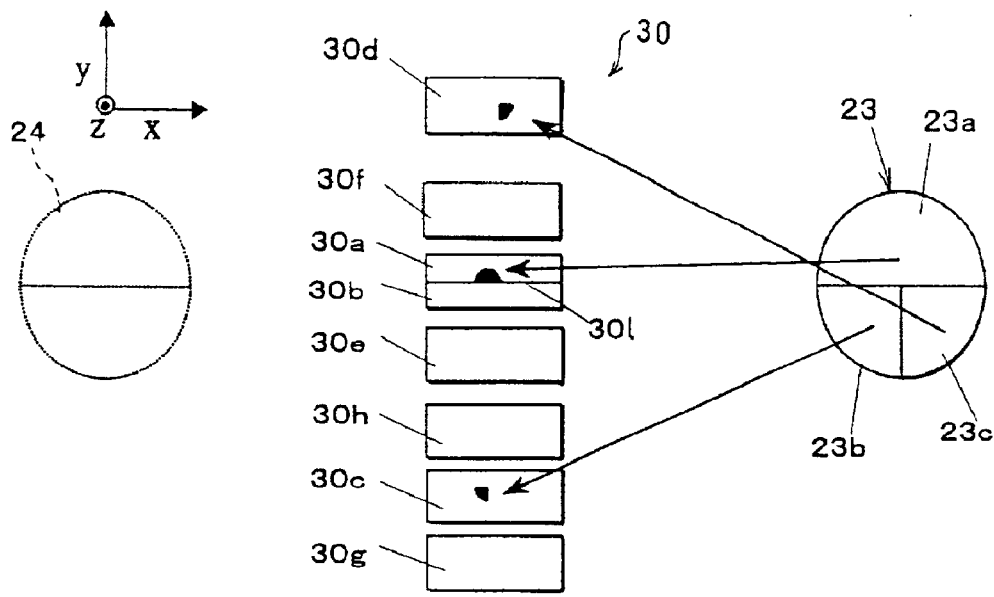
FIG. 10 is an explanatory view showing other division patterns in the first hologram element and the light receiving element, respectively.
Figure 11:
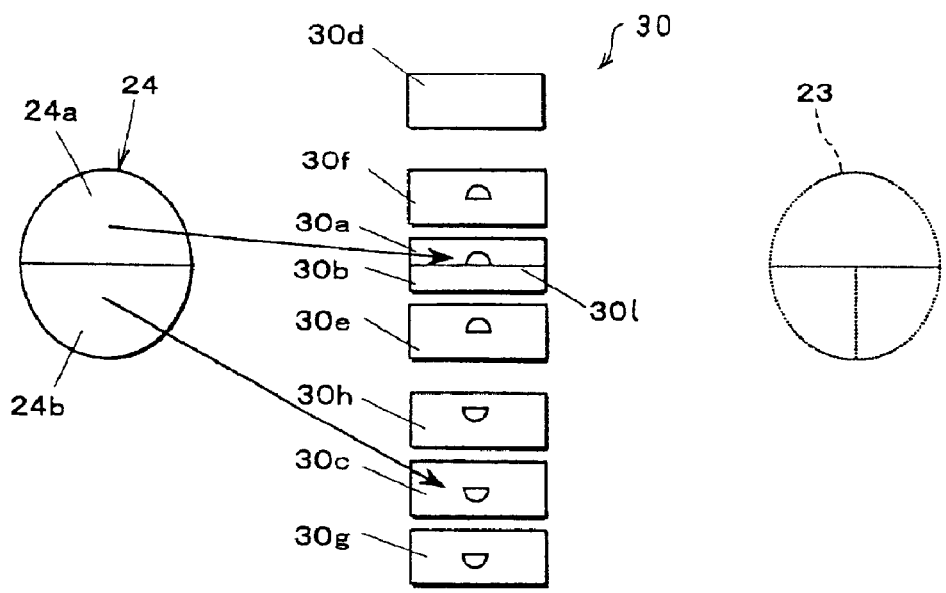
FIG. 11 is an explanatory view showing other division patterns in the second hologram element and the light receiving element, respectively.

Therefore, by using light receiving elements as shown in FIGS. 10 and 11, the adverse effects can be removed. The light receiving elements are aligned in a row in a direction perpendicular to a direction in which the hologram elements 23 and 24 are aligned. In this arrangement, stray light from the other hologram element is prevented.

FIG. 10 shows the first hologram element 23 and the form of light receiving elements of a photosensor 30. The division state of the hologram element 23 is the same as that of FIG. 6(a). The light receiving elements is made up of a 2-division light receiving element which is divided into light receiving regions 30a and 30b by a division line 30l, and six light receiving regions 30c to 30h (here, respective output from the light receiving regions are referred to as Sa to Sh).

For example, when playing a DVD back, light diffracted at the region 23a of the first hologram element 23 is focused on the division line 30l dividing the light receiving element into the light receiving regions 30a and 30b. The light diffracted at the region 23b of the first hologram element 23 is focused on the light receiving region 30c, and the light diffracted at the region 23c of the first hologram element 23 is focused on the light receiving region 30d. A servo signal is detected from absolutely the same calculation described referring to FIGS. 6(a) to 6(c).

Next, FIG. 11 shows the second hologram element 24 and the light receiving elements of the photosensor 30. As shown in FIG. 11, in the case of the hologram element 24, as with FIG. 7, light diffracted at the region 24a of the second hologram element 24 is focused on the division line 30l dividing the light receiving element into light receiving regions 30a and 30b, and light diffracted at the region 24b of the second hologram element 24 is focused on the light receiving region 30c.

The sub-beam A diffracted at the regions 24a and 24b of the second hologram element 24 is focused on the light receiving regions 30f and 30h, respectively. The sub-beam B diffracted at the regions 24a and 24b of the second hologram element 24 is focused on the light receiving regions 30e and 30g, respectively.

A focus error signal (FES), as with the DVD, can be detected by FES=Sa−Sb.

Further, a tracking error signal 3 (TES 3), according to the three-beam method, can be detected by TES 3=(Sf+Sh)−(Se+Sg).

Further, a stored information signal (RF signal) can be reproduced by RF=Sa+Sb+Sc.

By thus aligning light receiving elements in a row, an adverse effect of stray light from the other hologram element can be removed.

Next, the following will explain a method for controlling generation of an FES offset due to variations in wavelength. In FES detection utilizing diffraction light by a hologram element and the like, a variation in wavelength of a light source causes a diffraction angle to change, then, a beam position on the light receiving element shifts, thereby causing a phenomenon of an offset.

A popular method for correcting the offset is such that, for example, an angle is added to a direction of the division line of the 2-division light receiving element and in a diffracting direction of a beam. In the present embodiment, in order to detect an FES, which is caused by diffraction light from the two hologram elements, by the shared 2-division light receiving element, variations in wavelength of both light beams should be corrected.

Figures 12A, 12B:
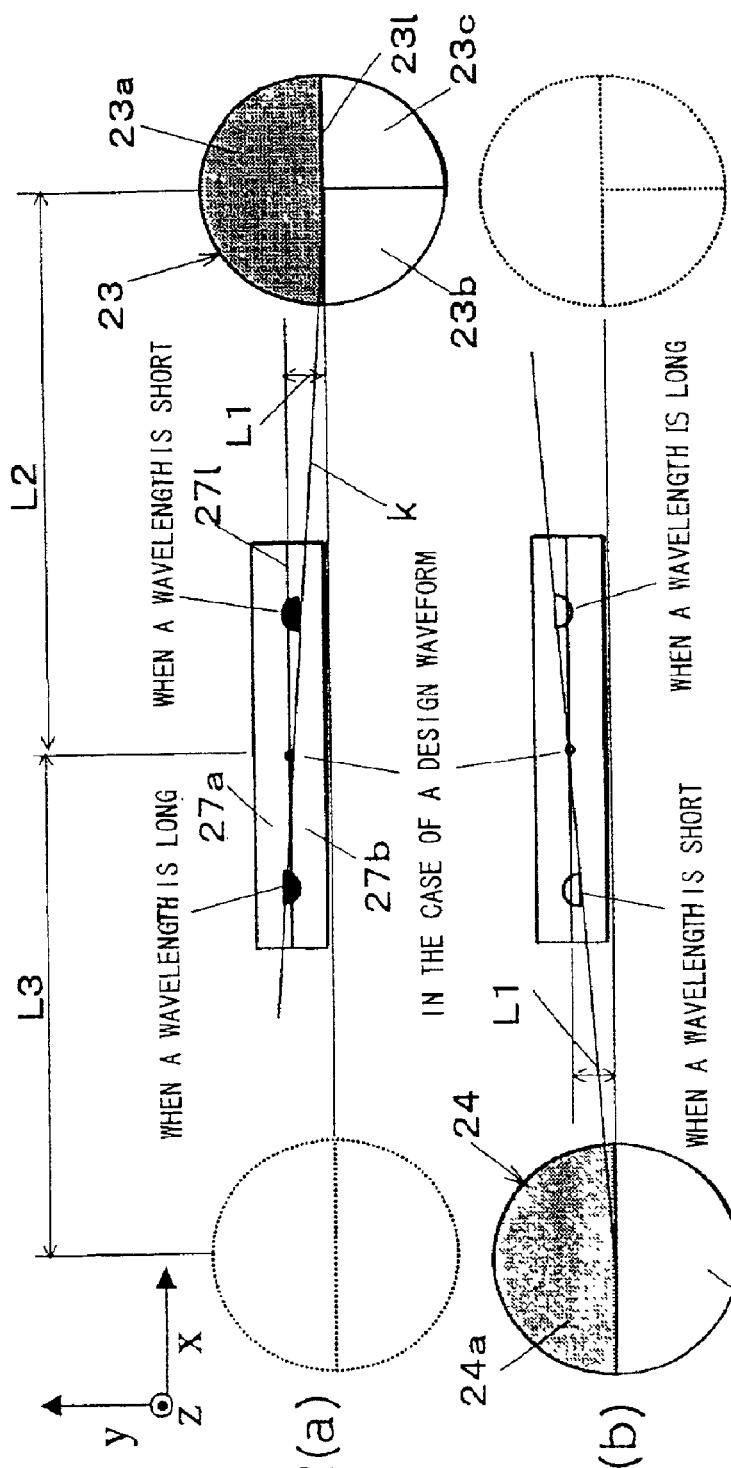
FIGS. 12(a) and 12(b) are explanatory views showing division patterns in the hologram elements and the light receiving element for correcting an adverse effect of variations in wavelength of diffraction light.

In FIG. 12(a), in order to correct an adverse effect of variations in wavelength of light from the first hologram element 23 first, a focusing position of the diffraction light from the region 23a of the first hologram element 23 is shifted into a positive y direction by a quantity L1.

This produces an angle between a diffracting direction k and the division line 27l. Therefore, there occurs no difference in output between the light receiving regions 27a and 27b even when variations in wavelength cause a beam to shift, thereby generating no offset in an FES according to the single knife edge method.

FIG. 12(b) shows light from the second hologram element 24. In order to achieve the same effect as above, it is effective to use a semicircular beam from the region 24a of the second hologram element 24 so as to generate an FES according to the single knife edge method.

According to the single knife edge method, an FES can be detected by using either of division patterns of the regions 24a and 24b of the second hologram element 24. However, in the case where a focusing position, that is, a position of the division line 27l is shifted into the positive y direction, only the use of the semicircular beam from the region 24a of the second hologram element 24 is effective in the cancellation of the FES offset due to variations in wavelength.

An optimum value of the shift quantity L1 can be calculated by controlling distances L2 and L3 between a focusing point and the center of a hologram.

Further, in FIG. 13(a), in order to correct an adverse effect of variations in wavelength of light from the first hologram element 23, the division line 27l on which the diffraction light from the region 23a of the first hologram element 23 is focused is tilted by a quantity θ.

This prevents occurrence of a difference in output between the light receiving regions 27a and 27b even when variations in wavelength cause a beam to shift, thereby generating no offset in an FES according to the single knife edge method.

FIG. 13(b) shows light from the second hologram element 24. In order to achieve the same effect as above, unlike the case of FIG. 12(b), as shown in FIG. 13(b), it is necessary to use a semicircular beam from the region 24b of the second hologram element 24. An optimum value of the tilt angle θ can be calculated by controlling the distances L2 and L3 between a focusing point and the center of a hologram.

As discussed, even when adopting the light receiving element common to the both two hologram elements 23 and 24, an offset by variations in wavelength of an FES due to diffraction light from the hologram elements 23 and 24 can be corrected.

Note that, in FIGS. 7 and 11, the three-beam method has been adopted in TES detection for a CD; however, a method is not limited to this, and it is possible to detect a TES according to a differential push-pull (DPP) method which also uses three beams. This method is used in a recording/playback pickup optical system for CD-Rs, etc.

Figure 14:
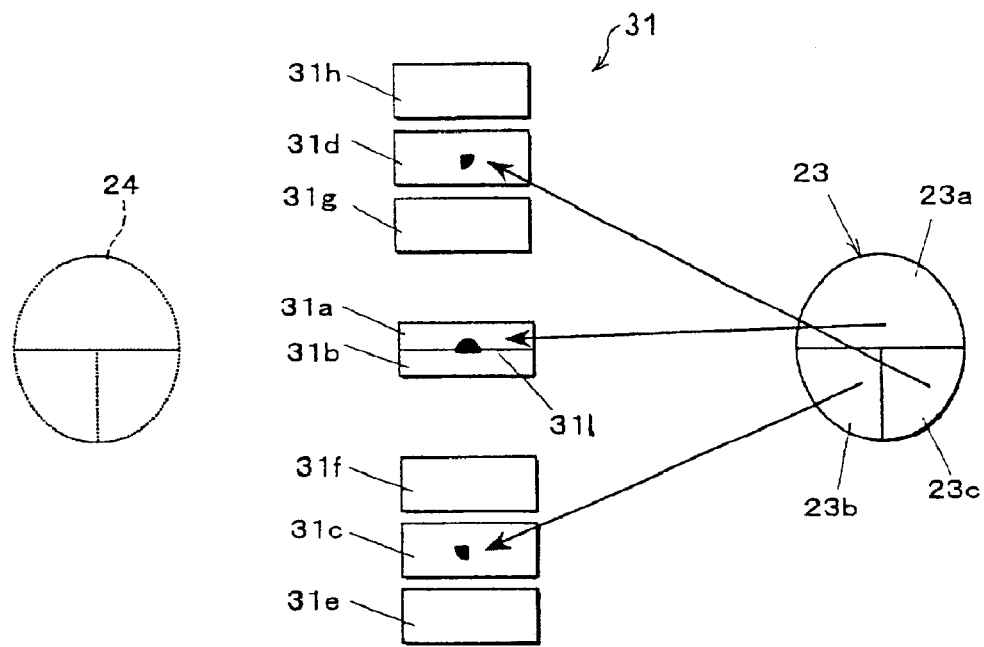
FIG. 14 is an explanatory view showing other division patterns of the first hologram element and the light receiving element.
Figure 15:
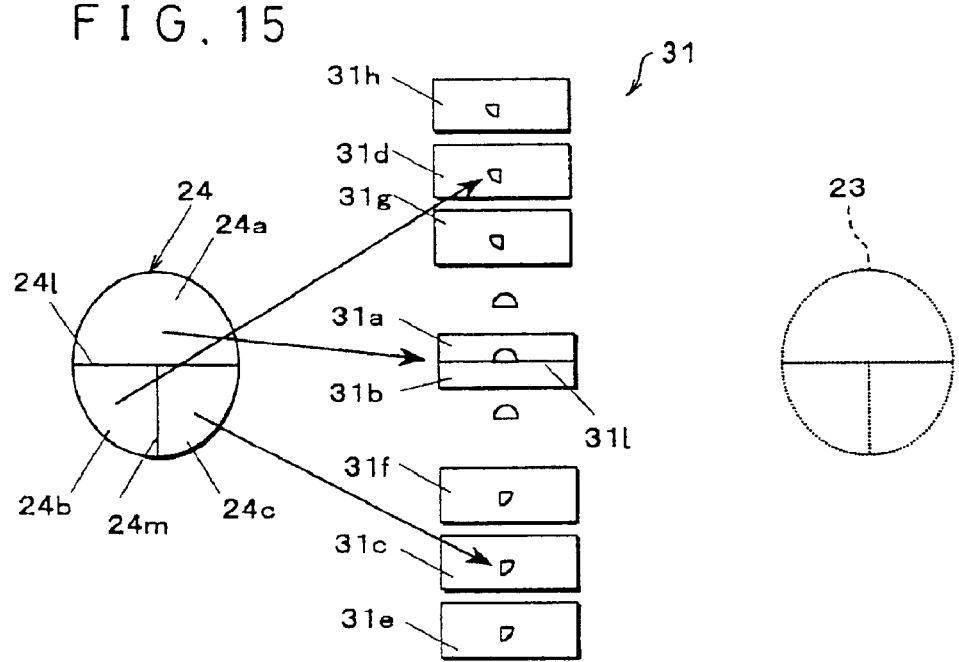
FIG. 15 is an explanatory view showing other division patterns of the second hologram element and the light receiving element.

FIGS. 14 and 15 show hologram elements and the light receiving elements of a photosensor 31. FIG. 14 shows the first hologram element 23 and the form of the light receiving elements of the photosensor 31. As shown in FIG. 14, the hologram element 23 is divided into three regions as with FIG. 6(a). The light receiving elements is made up of a 2-division light receiving element which is divided into light receiving regions 31a and 31b by a division line 31l, and six light receiving regions 31c to 31h (here, respective output from the light receiving regions are referred to as Sa to Sh).

For example, when playing a DVD back, light diffracted at the region 23a of the hologram element 23 is focused on the division line 31l dividing the light receiving element into the light receiving regions 31a and 31b. Likewise, light diffracted at the region 23b of the hologram element 23 is focused on the light receiving region 31c, and light diffracted at the region 23c of the hologram element 23 is focused on the light receiving region 31d. A servo signal and an RF signal can be calculated by the absolutely the same calculation described referring to FIGS. 6(a) to 6(c).

Next, FIG. 15 shows the second hologram element 24 and the light receiving elements of the photosensor 31. As shown in FIG. 15, the hologram element 24 is split into three regions 24a to 24c by a split line 24l in the x direction corresponding to the radial direction of the optical disk and a split line 24m in the y direction corresponding to the track direction.

When playing a CD back, light diffracted at the region 24a of the second hologram element 24 is focused on the division line 31l dividing the light receiving element into the light receiving regions 31a and 31b. Likewise, light diffracted at the region 24b of the second hologram element 24 is focused on the light receiving region 31d, and light diffracted at the region 24c of the second hologram element 24 is focused on the light receiving region 31c.

Since light from the second semiconductor laser 21 is split into a main beam and two sub-beams A and B by the three-beam diffraction grating 22, the sub-beams A and B diffracted at the region 24c of the second hologram element 24 are respectively focused on the light receiving regions 31f and 31e. The sub-beams A and B diffracted at the region 24b of the second hologram element 24 are respectively focused on the light receiving regions 31h and 31g.

A focus error signal (FES), as with the DVD, can be detected by FES=Sa−Sb.

Further, a tracking error signal 4 (TES 4) can be detected according to the differential push-pull (DPP) method, using push-pull signals TES 5, TES (A) and TES (B) of the main beam and the sub-beams A and B, respectively, by 4=TES 5−k·(TES (A)+TES (B))=(Sa−Sb)−k·((Sh−Sg)+(Sf−Se)).

Here, a coefficient k is provided to correct a difference in light intensity between the main beam and sub-beams. Accordingly, when a ratio of intensity is the main beam:sub-beam A:sub-beam B=a:b:b, the coefficient k=a/(2b).

Further, a stored information signal (RF signal) can be reproduced by RF=Sa+Sb+Sc+Sd.

Next, the following will explain the hologram elements and the control of the complex PBS. Explained first will be the offset control of an FES that is important in the assembly control of the integrated laser unit 10.

FIG. 16 is a three-dimensional view of the integrated laser unit 10 shown in FIG. 2. In this unit, the semiconductor lasers 20 and 21, and the photosensor 27 are fixedly located at a predetermined position on a stem, which is not shown, within the laser package 28. On an upper surface of the laser package 28 are stacked the transparent substrate 29 having holograms 23, 24 and the diffraction grating 22 formed therein and complex PBS 25. The control is performed by parallel shifts in the X and Y directions and rotation around a central Z axis in a θ direction, within a plane (within a plane XY) which is perpendicular to an emission light axis.

Control procedures will be explained briefly. First, the second semiconductor laser 21 is caused to emit light, and when returned, the returning light is diffracted at the second hologram element 24, thereby performing control in a state that the thus diffracted light is guided to the photosensor 27. In that case, in order that the FES offset becomes zero, the transparent substrate 29 (i.e., the second hologram element 24) is controlled by rotation in the θ direction around an optic axis O which is shown in FIG. 16, while controlling positions in the X and Y directions so that the center of the beam and the center of the hologram coincide.

Here, the returning light is only transmitted through the PBS surface 25A of the complex PBS 25. Therefore, a beam over the photosensor 27 is not affected regardless of whether the complex PBS 25 is rotated together with the transparent substrate 29 or fixed without being rotated.

Next, after the transparent substrate 29 is fixedly bonded to the laser package 28, the first semiconductor laser 20 is caused to emit light, and the returning light is reflected at the reflector surfaces 25A and 25B of the complex PBS and diffracted at the first hologram element 23, thereafter guiding the thus diffracted light to the photosensor 27.

Since the transparent substrate 29 is controlled by rotation when controlling the second semiconductor laser 21, the position of the first hologram element 23 deviates from the primary position accordingly. Therefore, next, the same control by rotation in the θ direction around the optic axis O is performed with respect to the complex PBS 25, thereby controlling the FES offset to zero.

Here, the control of the parallel shifts of the complex PBS 25 into the X and Y directions is not affected by the shift of a beam, thereby requiring no fine adjustment.

As described, with respect to beams from the two semiconductor lasers 20 and 21, the position control over the photosensor 27 can be performed independently and separately. Accordingly, even when there are tolerances in the positional relationship between laser chips or in the position and/or the angle of the laser package 28, the photosensor 27, the hologram elements 23 and 24, and/or the complex PBS 25, an optimum servo error signal can be obtained by the control.

Furthermore, the FES offset control will be explained in detail with reference to FIGS. 17 to 20. FIGS. 17 to 20 schematically show positional relationships among the hologram elements 23 and 24, and the light receiving regions 30a to 30h, where the hologram elements and the light receiving elements are the same as those shown in FIG. 11.

Figure 17:
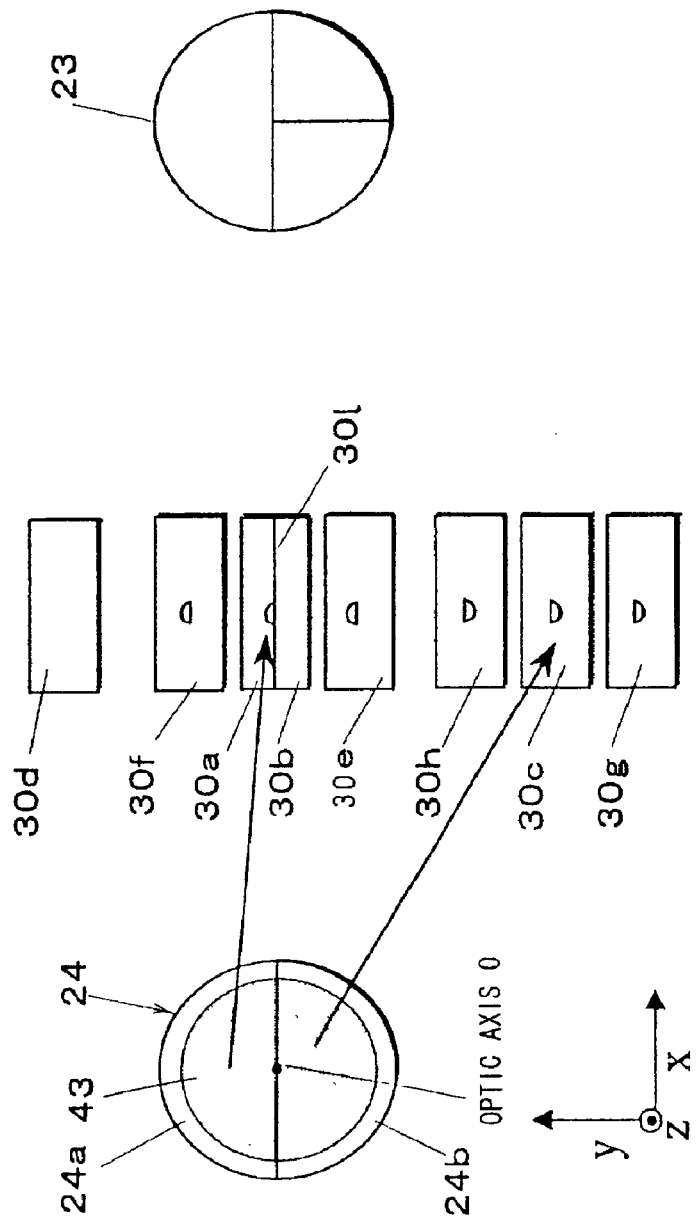
FIG. 17 is a diagram for an explanation of control of the second hologram element.

FIG. 17 shows the returning light of the second semiconductor laser 21, where, one of the returning light beams 43 diffracted at a semicircular region 24a of the hologram element 24 is directed to a point in the vicinity of the division line 30l on an FES detecting 2-division light receiving element.

However, since component errors, etc., cause a relative position among the hologram, the laser chip and the light receiving elements to deviate from a designed value in a range of a tolerance, the position of the beam deviates off the division line, and/or deviates from the focusing state, thereby upsizing the beam.

Figure 18:
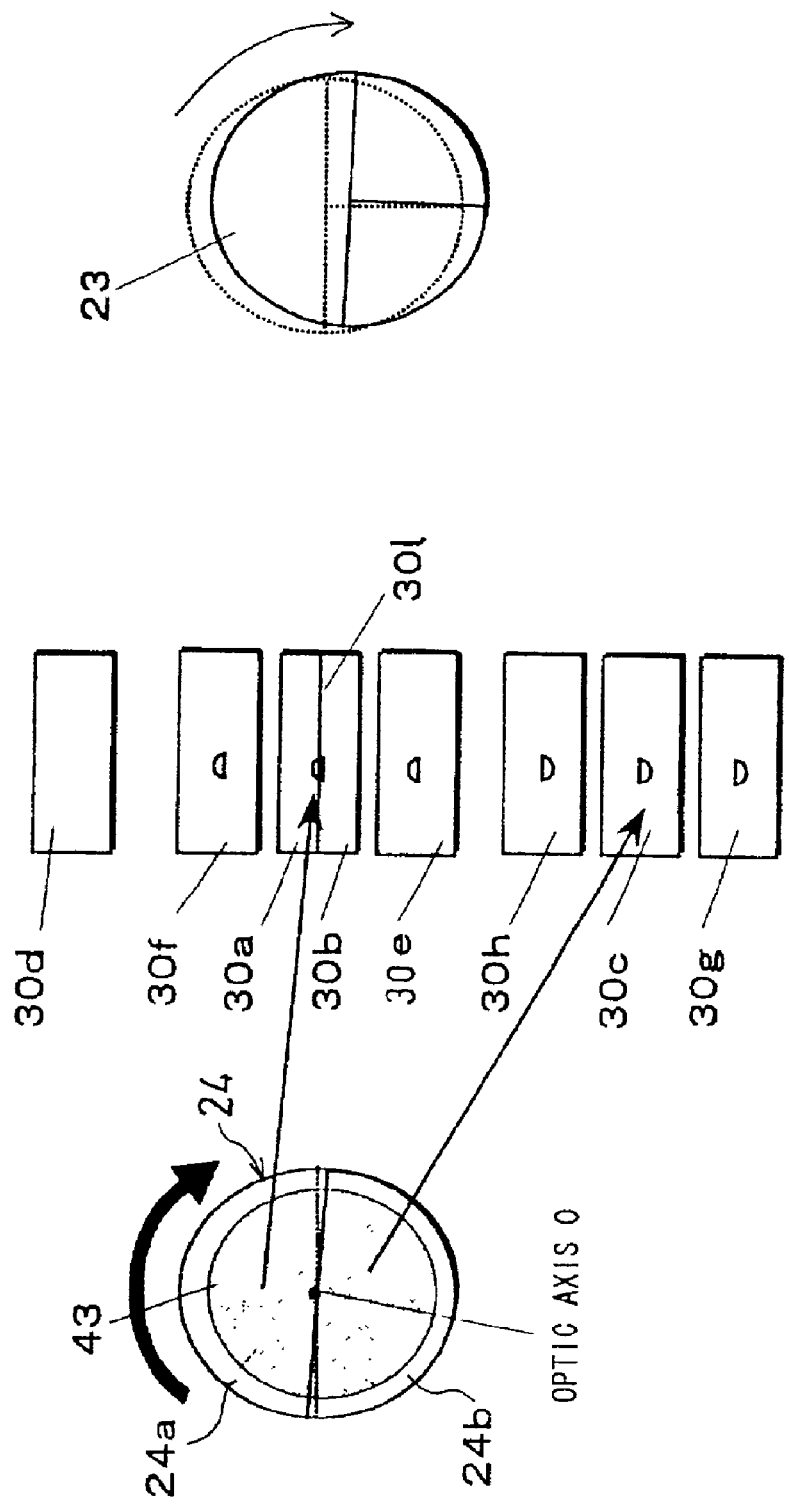
FIG. 18 is a diagram for an explanation of control of the second hologram element.

Accordingly, as shown in FIG. 18, in order that the FES offset becomes zero in that state, the hologram element 24 is rotated so that diffraction light from the region 24a is directed to the division line 30l, thereby reducing the FES offset to zero.

Figure 20:
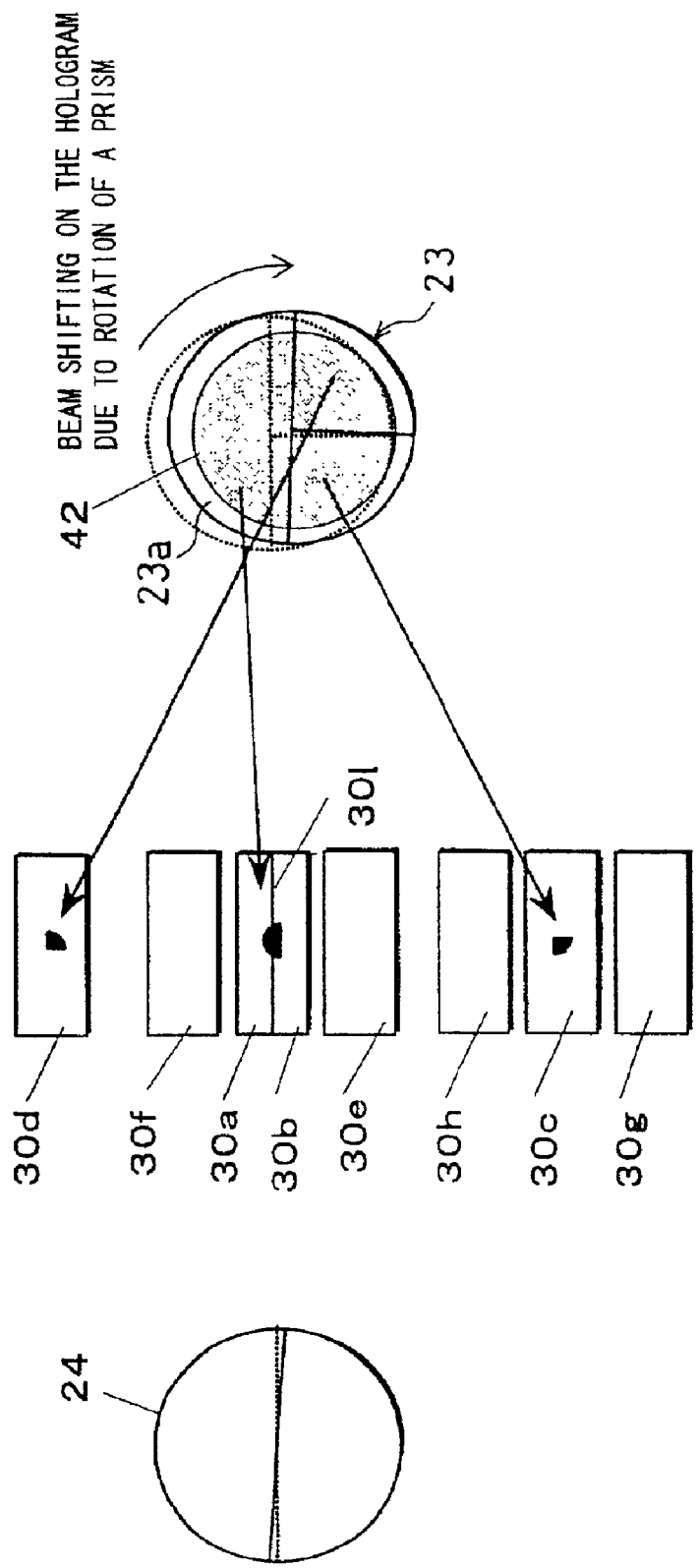
FIG. 20 is a diagram for an explanation of control of a complex prism.

Next, the control of light from the first semiconductor laser 20 will be explained with reference to FIGS. 19 and 20. FIG. 19 shows a state in which returning light from the second semiconductor laser 21 is controlled, where the first hologram element 23 is shifted from the primary position (indicated by the dotted line).

Accordingly, the center of the returning light 42 reflected at the complex PBS 25 deviates from the center of the first hologram element 23. Further, light diffracted at the region 23a of the first hologram element 23 for the FES detection deviates off the division line 30l of the FES detecting 2-division light receiving element, or deviates from the focusing state, thereby upsizing the beam.

Therefore, in order that the FES offset becomes zero in that state, the complex PBS 25 is rotated around the optic axis O this time. This shifts a beam on the hologram 23 as shown in FIG. 20, that is, shifts the position of the beam on the light receiving element so as to control diffraction light from the region 23a of the first hologram element 23 to be directed to the division line 30l, thereby reducing the FES offset to zero.

Note that, in the embodiment above, explanation has been made through the case where a red laser of a 650 nm band is adopted as the first semiconductor laser 20, and an infrared laser of a 780 nm band is adopted as the second semiconductor laser 21; however, the present invention is not limited to that case and is also applicable to the case where laser sources of two different wavelengths including a blue laser of a 400 nm band is adopted.

Next, the following will describe a Second Embodiment of the present invention with reference to FIGS. 21 to 29. Note that, the same portions as those pertaining to the First Embodiment will be given the same reference symbols, and explanation thereof will be omitted here.

In the First Embodiment, as shown in FIGS. 1 and 2, the second hologram element 24 was provided in the middle of the outward travel paths of light beams 40 and 41 respectively emitted from the first and second semiconductor lasers 20 and 21 with respect to the optical disk 6. This arrangement involves a problem of the large loss of a quantity of light incident onto the optical disk 6 because unwanted ±1st order diffraction light is generated by the second hologram element 24 even in the outward travel paths. Further, in respect of light of a second wavelength, a quantity of light incident on the photosensor 27 is determined by the product of the 0th order diffraction efficiency and the ±1st order diffraction efficiency of the second hologram element 24, thereby making it difficult to increase a quantity of detection light. The Second Embodiment of the present invention is the invention to solve such problems.

Figure 21:
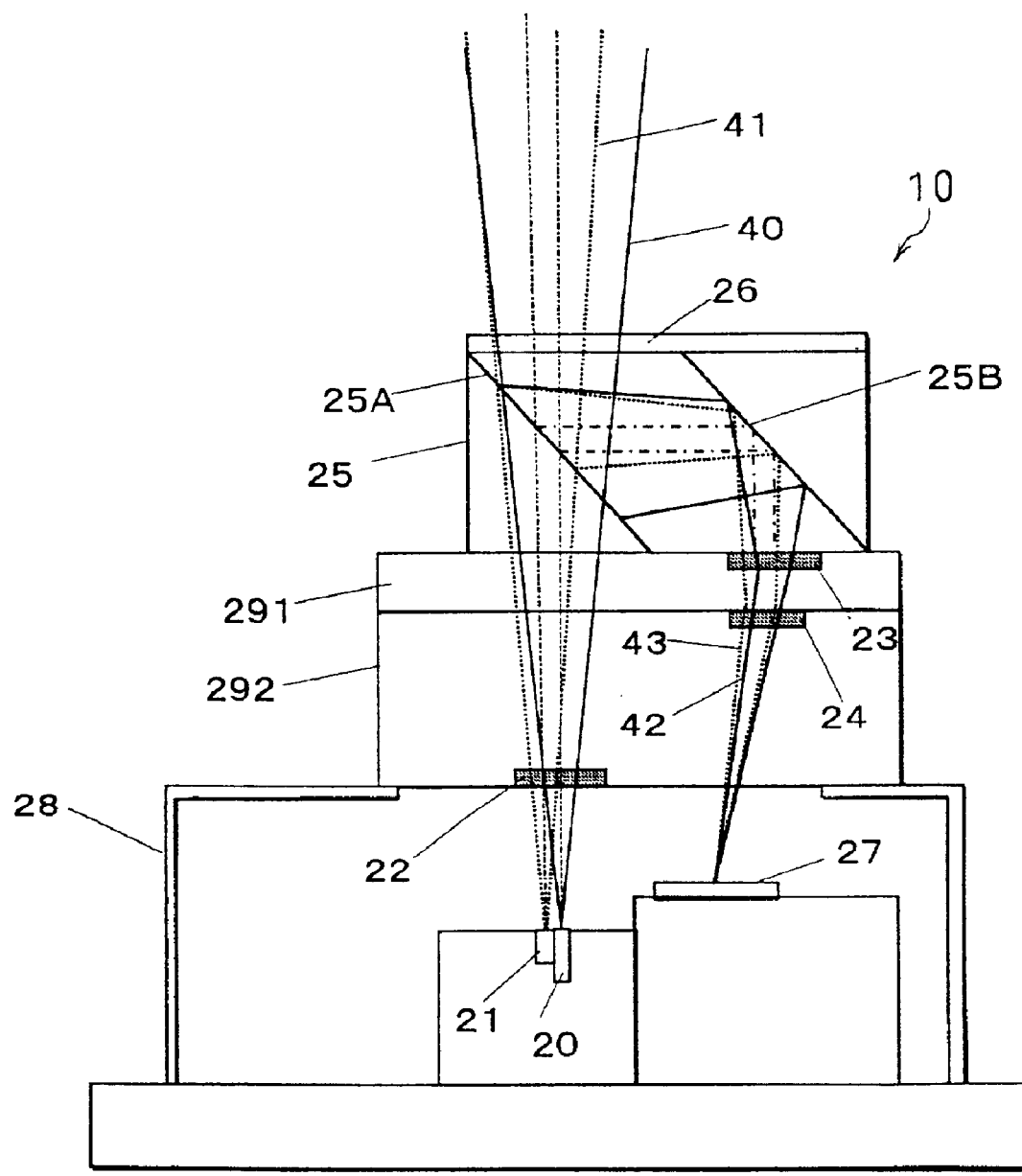
FIG. 21 is a front view showing a configuration of a first integrated laser unit according to a Second Embodiment of the optical pickup of the present invention.
Figure 22:
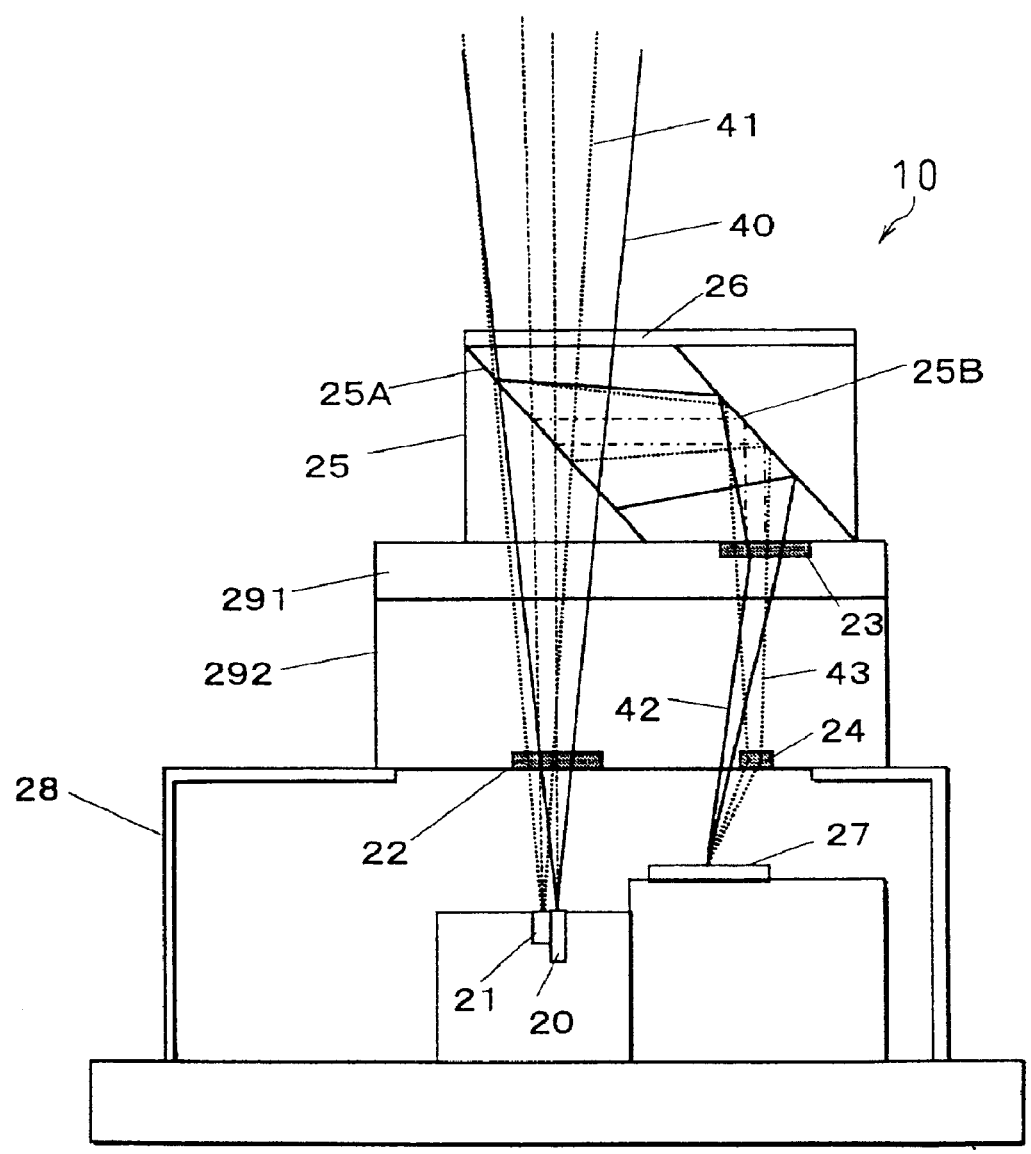
FIG. 22 is a front view showing a configuration of a second integrated laser unit according to the Second Embodiment of the optical pickup of the present invention.

FIGS. 21 and 22 are schematic views of an optical pickup according to the present embodiment. Here, the optical pickup is arranged as with FIG. 1 and the First Embodiment above except for the configuration of the integrated laser unit 10, and detailed explanation of the optical pickup will be omitted. An integrated laser unit 10 will be explained with reference to FIG. 21.

The integrated laser unit 10 according to the present embodiment includes a first semiconductor laser 20, a second semiconductor laser 21, a three-beam diffraction grating 22, a complex PBS 25, a wave plate 26, a first hologram element 23, a second hologram element 24, and a light receiving element 27. The first semiconductor laser 20 which starts oscillating when a wavelength of laser light is in a 650 nm band and the second semiconductor laser 21 which starts oscillating when a wavelength of laser light is in a 780 nm band are adjacently disposed. The three-beam diffraction grating 22 causes emergence of three beams for tracking control. The complex PBS 25 has a polarization beam splitter surface 25A and a reflector surface 25B. The first hologram element 23 diffracts a light beam of the first semiconductor laser 20 and guides the diffracted light beam to the light receiving element 27, and the second hologram element 24 diffracts a light beam of the semiconductor laser 21 and guides the diffracted light beam to the light receiving element 27.

Further, the first hologram element 23 is formed on a transparent substrate 291, to which it is fixedly bonded integrally with the complex PBS. The second hologram element 24 is formed on an upper side of a transparent substrate 292. The structures of light sources of the optical pickup are the same as those described in the First Embodiment with reference to FIG. 3, thereby omitting explanation thereof here.

Next, the following will explain a method for playing back different optical disks. Since this is basically the same as the First Embodiment, the function of the integrated laser unit 10 alone will be explained here.

For example, when playing back a DVD having a plate thickness of 0.6 mm, a light beam 40 emitted from the first semiconductor laser 20 of the 650 nm band is transmitted through the diffraction grating 22, then further transmitted through the polarization beam splitter surface 25A of the complex PBS 25 and the wave plate 26, thereafter being focused on an optical disk 6A having a plate thickness of 0.6 mm by a collimator lens 11 and an objective lens 5.

Further, returning light is reflected at the polarization beam splitter surface 25A and the reflector surface 25B, thereafter being diffracted at the first hologram element 23, transmitted through the second hologram element 24, then, focused on a photosensor 27.

Meanwhile, when playing back a CD having a plate thickness of 1.2 mm, a light beam 41 emitted from the second semiconductor laser element 21 of the 780 nm band is split into three beams by the diffraction grating 22. The split beams are transmitted through the polarization beam splitter surface 25A of the complex PBS 25 and the wave plate 26, thereafter being focused on an optical disk 6B having a plate thickness of 1.2 mm by the collimator lens 11 and the objective lens 5.

Further, returning light is reflected at the polarization beam splitter surface 25A and the reflector surface 25B, thereafter being transmitted through the first hologram element 23, diffracted at the second hologram element 24, then, focused on the photosensor 27.

Here, the same function of the three-beam diffraction grating 22 as with the First Embodiment is utilized.

It is desirable that the first hologram element 23 is set to have a groove depth such that ±1st diffraction efficiency is high with respect to the light of the wavelength of the first semiconductor laser 20, and 0th order efficiency is high with respect to the light of the wavelength of the second semiconductor laser 21. On the contrary, it is desirable that the second hologram element 24 is set to have a groove depth such that ±1st diffraction efficiency is high with respect to the light of the wavelength of the second semiconductor laser 21, and 0th order efficiency is high with respect to the light of the wavelength of the first semiconductor laser 20.

Further, though respective diffraction angles of the hologram elements increase, it is possible to ease the above conditions of the groove depths. For example, as shown in FIG. 22, it may be arranged such that the second hologram element 24 is formed on a lower side of the transparent substrate 292 so that the light of the first semiconductor laser 20 diffracted at the first hologram element 23 is prevented from passing through the second hologram element 24.

A polarization characteristic of the PBS surface 25A of the complex PBS 25 is such that, as with the example in the First Embodiment, 100% of P polarized light is transmitted and substantially 100% of S polarized light is reflected in both cases of the light from the first semiconductor laser 20 having the wavelength of the 650 nm band and the light from the second semiconductor laser 21 having the wavelength of the 780 nm band.

Further, the wave plate 26 is fixedly bonded to an upper side of the complex PBS 25 and set to have a thickness which generates a phase difference to act as a ¼ wave plate with respect to both the light from the first semiconductor laser 20 having the wavelength of the 650 nm band and the light from the second semiconductor laser 21 having the wavelength of the 780 nm band.

Accordingly, respective P polarized light (linearly polarized light in the x direction in FIG. 1) 40 and 41 emitted from the both light sources is all changed into circularly polarized light at the ¼ wave plate 26, thereafter being incident on the optical disk 6A. The returning light is incident again on the ¼ wave plate 26 so as to be changed into linearly polarized light in the y direction (S polarized light). The linearly polarized light is reflected at the PBS surface 25A and the reflector surface 25B, thereafter being incident on each of the hologram elements 23 and 24.

Note that, the structures of the first hologram element 23 and the photosensor 27, and the method for detecting a servo signal as explained with reference to FIGS. 6, 7, 10, 11, 14 and 15 are applicable, thereby omitting explanation thereof here. In addition, the absolutely the same detection method adopted in the First Embodiment is applicable to the second hologram element 24 here, except for its location within an optical path from the first hologram element 23 to the photosensor 27, thereby omitting explanation here.

Next, the control of the hologram elements will be explained. In addition, as with the First Embodiment, the FES offset control will be explained. However, since they are the same as those described in the First Embodiment, explanation will be made briefly here.

First, the first semiconductor laser 20 is caused to emit light, and the returning light is diffracted at the first hologram element 23 and guided to the photosensor 27, thereafter performing control in that state. In order that the FES offset here becomes zero, the transparent substrate 291 (i.e., the first hologram element 23) to which the complex PBS 25 is integrally and fixedly bonded is controlled by rotation in the θ direction shown in FIG. 16, while controlling the positions in the x and y direction so that the center of a beam and the center of a hologram coincide.

In that case, since the light 42 is only transmitted through the second hologram element 24, the position of the transparent substrate 292 is not affected.

Further, the second semiconductor laser element 21 is caused to emit light while fixing the position of the transparent substrate 291 to which the complex PBS 25 is integrally and fixedly bonded. The returning light is diffracted at the second hologram element 24, thereafter guiding the diffracted light to the photosensor 27. Since the complex PBS 25 has been optimized for the first semiconductor laser 20 together with the first hologram element 23, the complex PBS 25 may not ideally be suited to the light of the second semiconductor laser 21.

Accordingly, in order to reduce the FES offset to zero, the transparent substrate 292 (i.e., the second hologram element 24) is controlled by rotation in the θ direction, while controlling the positions in the x and y directions so that the center of a beam and the center of a hologram coincide.

As described, it is possible to control the positions of beams respectively from the two semiconductor lasers 20 and 21 over the photosensor 27 independently and separately. This makes it possible to obtain an optimum servo error signal by the control even when there are tolerances in the positional relationship between laser chips, or in the position or angle of the laser package 28, the photosensor 27, the hologram elements 23 and 24, and/or the complex PBS 25.

Meanwhile, unlike the First Embodiment, the hologram element 24 is not provided in the middle of an outward travel path. Therefore, any unwanted diffraction light is not generated in the outward travel path, thereby increasing a quantity of emission light from the objective lens 5. Moreover, providing the hologram elements 23 and 24 only in a return travel path enables diffraction efficiency to be set high, thereby increasing a quantity of detected light. This arrangement is particularly effective to a recording optical pickup which requires a larger quantity of emission light from the objective lens.

Figure 23:
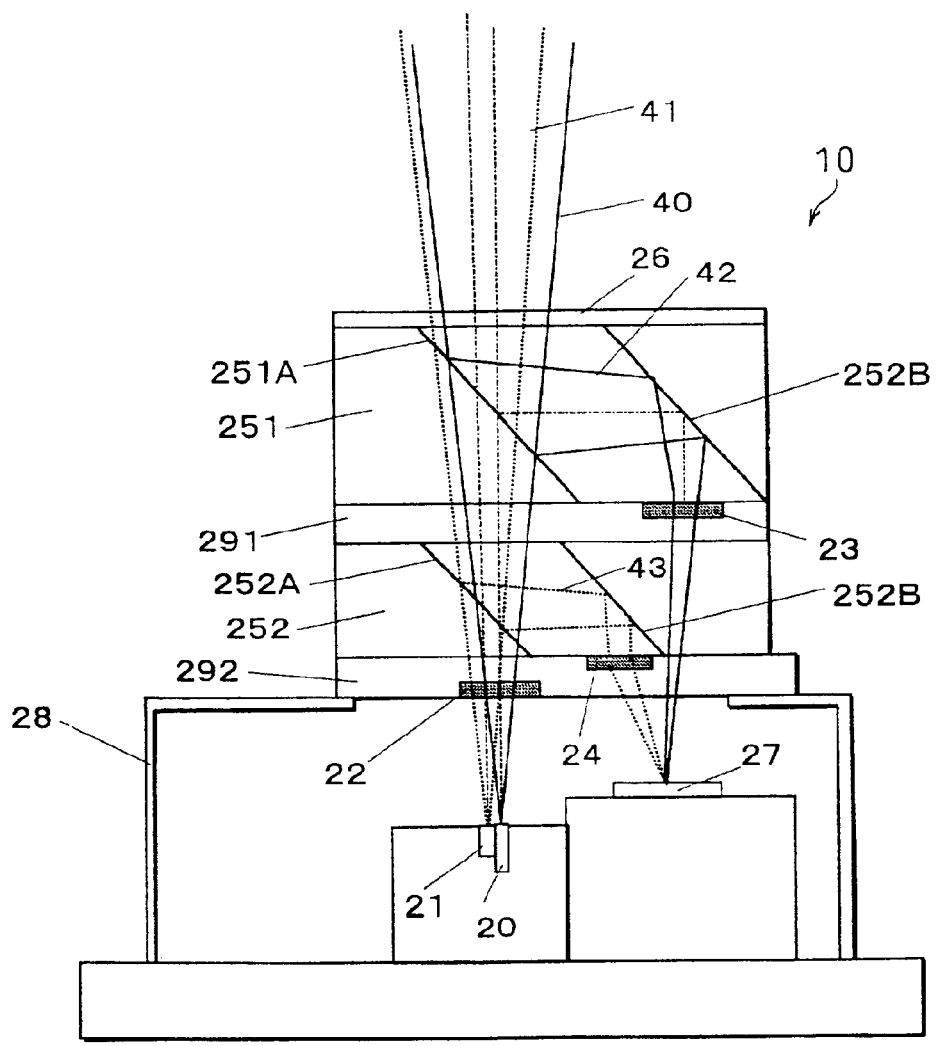
FIG. 23 is a front view showing a configuration of a third integrated laser unit according to the Second Embodiment of the optical pickup of the present invention.

Next, the following will explain details of another configuration according to the Second Embodiment of the present invention, with reference to FIG. 23. Note that, the same portions as those of the above configuration of FIG. 21 will be given the same reference symbols, and explanation thereof will be omitted here.

In the integrated laser unit 10 of FIGS. 21 and 22, in the case of controlling the first and second hologram elements 23 and 24, the complex PBS 25 and the first hologram element 23 on the upper side are first controlled integrally. Thereafter, the second hologram element 24 on the lower side should be controlled while fixing the complex PBS 25 and the first hologram element 23 thus integrally controlled lest they should move. However, such control poses problems in terms of fabrication that devices such as controlling tools become complicated, and stricter accuracy is demanded. Therefore, a configuration to solve these problems will be described below.

FIG. 23 shows an integrated laser unit 10 having another configuration according to the present embodiment, which differs from the integrated laser unit 10 of FIG. 21 in a way that the complex PBS 25 of FIG. 21 is separated into a first complex PBS 251 and a second complex PBS 252.

The first complex PBS 251 has a polarization beam splitter (PBS) surface 251A, a polarization characteristic of which is such that it transmits substantially 100% of P polarized light and reflects substantially 100% of S polarized light with respect to the first semiconductor laser 20 of the 650 nm band. In addition, with respect to the second semiconductor laser 21 of the 780 nm band, the PBS surface 251A has such a polarization characteristic as to transmit substantially 100% of both the P and S polarized light.

The second complex PBS 252 has a polarization beam splitter (PBS) surface 252A having such a polarization characteristic as to transmit substantially 100% of P polarized light and reflect substantially 100% of S polarized light at least with respect to the second semiconductor laser 21 of the 780 nm band. With respect to the first semiconductor laser 20 of the 650 nm band, it has such a polarization characteristic to transmit substantially 100% of both the P and S polarized light.

Further, the wave plate 26 is fixedly bonded to an upper surface of the complex PBS 251 and is set to have a thickness which generates a phase difference acting as a ¼ wave plate with respect to both wavelengths of the first semiconductor laser 20 of the 650 nm band and the second semiconductor laser 21 of the 780 nm band.

The first hologram element 23 is formed on the transparent substrate 291, which diffracts a light beam of the first semiconductor laser 21 so as to guide it to the photosensor 27. The transparent substrate 291 is fixedly bonded to a lower side of the first complex PBS 251 integrally. On the other hand, the second hologram element 24 is formed on the transparent substrate 292, which diffracts a light beam of the second semiconductor laser 21 so as to guide it to the light receiving element 27. The transparent substrate 292 is fixedly bonded to a lower side of the second complex PBS 252 integrally.

Note that, the structures of the first and second hologram elements 23 and 24 and the photosensor 27, and the method for detecting a servo signal are the same as those of FIGS. 21 and 22, thereby omitting explanation thereof here.

Next, the following will explain the control of the hologram elements 23 and 24. First, the second semiconductor laser 21 is caused to emit light, and the returning light is reflected at the polarization beam splitter surface 252A of the second complex PBS 252. Thereafter, the reflected light is diffracted at the second hologram element 24 and guided to the photosensor 27. With this state, in order to reduce the FES offset to zero, the transparent substrate 292 (i.e., the second hologram element 24) to which the complex PBS 252 is integrally and fixedly bonded is controlled by rotation in the θ direction, while controlling the positions in the x and y directions so that the center of a beam and the center of a hologram coincide.

Here, the returning light 43 of the second semiconductor laser 21 does not affect the positions of the first hologram element 23 and the complex PBS 251.

Further, the transparent substrate 292 to which the complex PBS 252 is integrally and fixedly bonded is further fixedly bonded to the laser package 28. Thereafter, the first semiconductor laser element 20 is caused to emit light, the returning light 42 is reflected at the polarization beam splitter surface 251A of the first complex PBS 251. Thereafter, the reflected light is diffracted at the first hologram element 24 and guided to the photosensor 27. As above, in order to reduce the FES offset to zero, the transparent substrate 291 (i.e., the first hologram element 23) is controlled by rotation in the θ direction, while controlling the positions in the x and y directions so that the center of a beam and the center of a hologram coincide.

As described, it is possible to control the positions of beams respectively from the two semiconductor lasers 20 and 21 over the photosensor 27 independently and separately. This makes it possible to not only attain the same effect as with the integrated laser unit 10 of FIG. 21 but also control and fix the lamination of a plurality of complex PBSs 251 and 252 and the hologram elements 23 and 24 in a upward sequence from the bottom on a cap of the laser package 28, thereby improving mass productivity of the integrated laser unit 10.

The following will describe another embodiment capable of attaining the same effect as above, configurations of which are shown in FIGS. 24 to 29.

Figure 24:
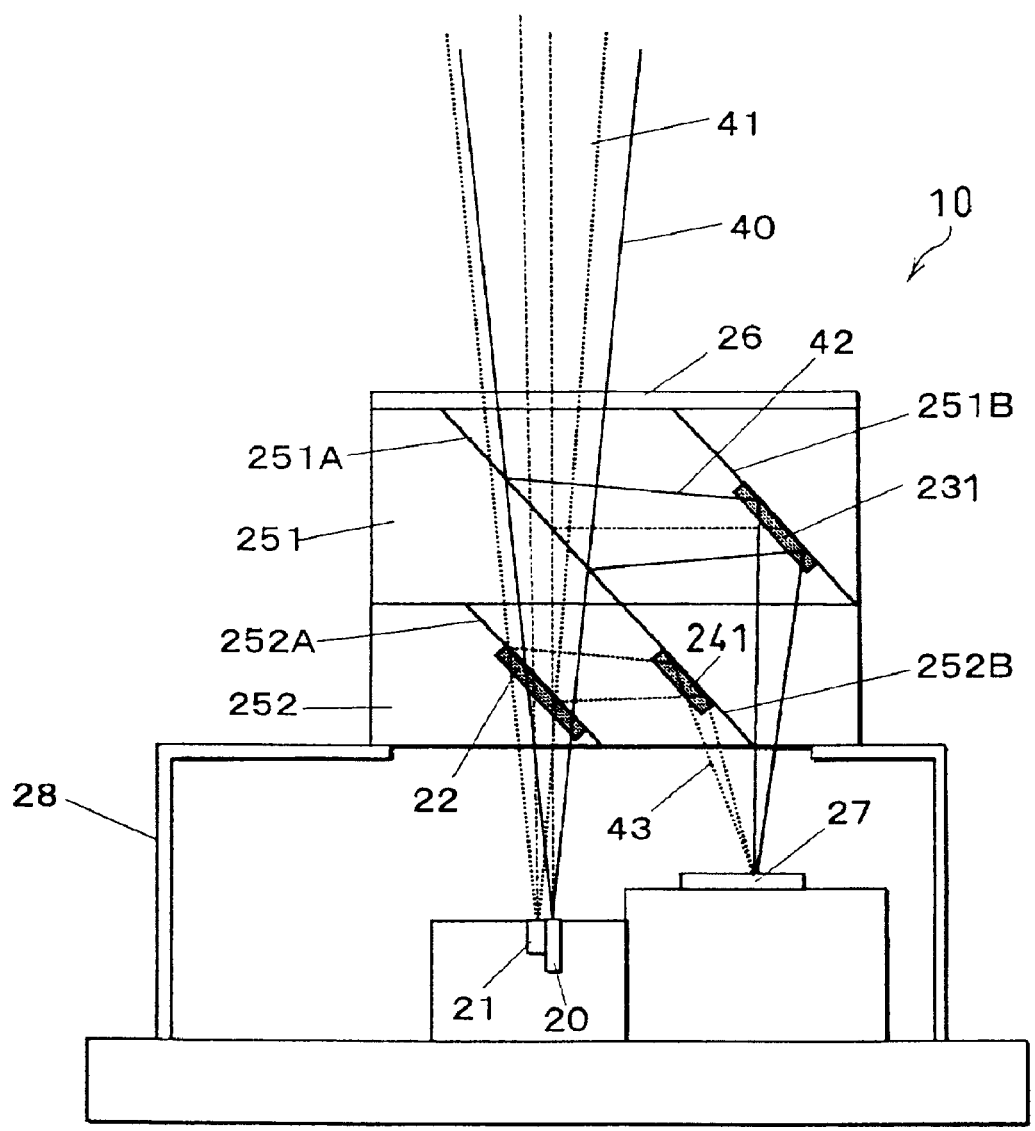
FIG. 24 is a front view showing a configuration of a fourth integrated laser unit according to the Second Embodiment of the optical pickup of the present invention.

In an integrated laser unit 10 of FIG. 24, first and second holograms 231 and 241 in the integrated laser unit of FIG. 23 are formed as reflective hologram elements on a reflector surface 251B of the complex PBS 251 and a reflector surface 252B of the second complex PBS 252, respectively.

Further, the three-beam diffraction grating 22 is formed on a polarization beam splitter surface 252A of the second complex PBS 252. This enables the transparent substrates 291 and 292 of FIG. 23 to be eliminated, thus reducing the number of components.

Note that, the control of the first and second hologram elements 231 and 241 is the same as that of the first and second hologram elements 23 and 24 of FIG. 23.

Figure 25:
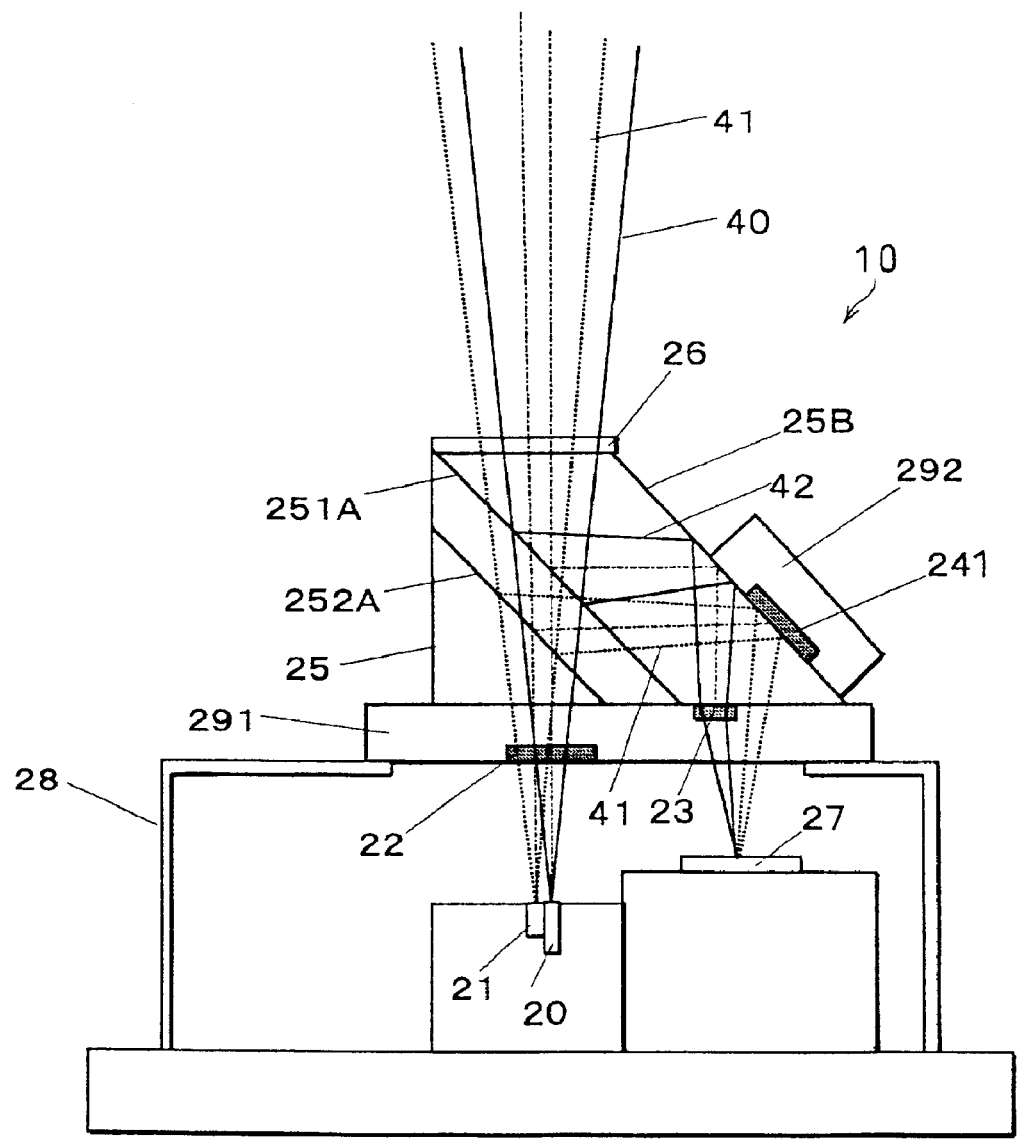
FIG. 25 is a front view showing a configuration of a fifth integrated laser unit according to the Second Embodiment of the optical pickup of the present invention.

An integrated laser unit 10 of FIG. 25 adopts the complex PBS 25 having the polarization beam splitter surfaces 251A and 252A in the integrated laser unit 10 of FIG. 23. In addition, the reflector surface 25B has such a characteristic as to reflect substantially 100% of light from the first semiconductor laser 20 of the 650 nm band and transmit light from the second semiconductor laser 21 of the 780 nm band.

The first hologram element 23 is formed on the transparent substrate 291. On the other hand, the 'reflective' second hologram element 241 is formed on the transparent substrate 292. The transparent substrate 292 is disposed on the reflector surface 25B so that the second hologram element 241 faces the reflector surface 25B of the complex PBS 25.

Next, the control of the hologram elements 23 and 241 will be explained. First, with respect to the first semiconductor laser 20, in order to reduce the FES offset to zero, the complex PBS 25 and the transparent substrate 291 (i.e., the first hologram element 23 ) are controlled by rotation in the θ direction, while controlling the positions in the x and y directions so that the center of a beam and the center of a hologram coincide. Further, after fixedly bonding the complex PBS 25 to the laser package 28, with respect to the second semiconductor laser 21, in order to reduce the FES offset to zero, the transparent substrate 292 (i.e., the second hologram element 241) is controlled by rotation and parallel shift on the reflector surface 25B.

An arrangement as shown in FIG. 24 requires a complicated fabrication step to incorporate a hologram element into the polarization beam splitter surface of the complex PBS 25. In contrast, in the arrangement of FIG. 25, the second hologram element 241 can be fabricated on the 'plane' transparent substrate 292, thereby improving mass productivity of the complex PBS 25.

Figure 26:
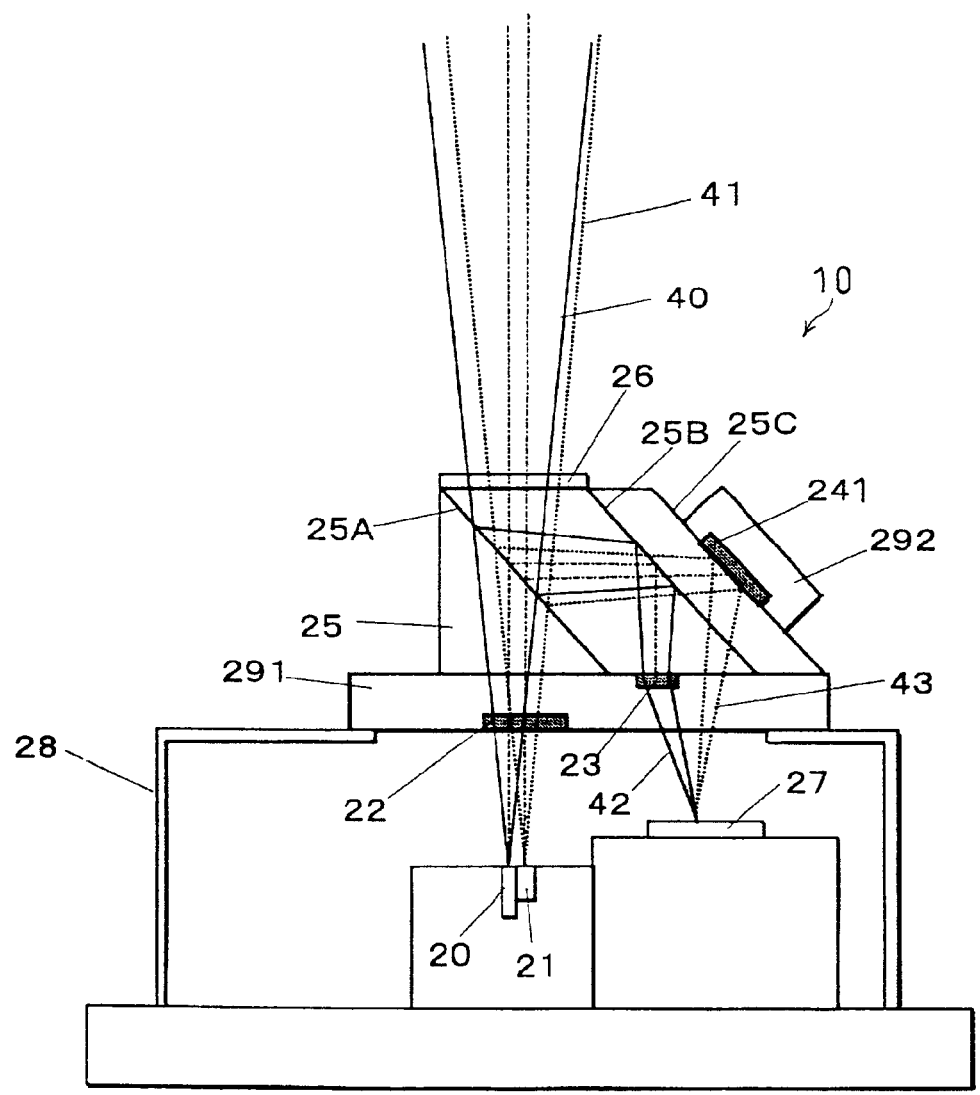
FIG. 26 is a front view showing a configuration of a sixth integrated laser unit according to the Second Embodiment of the optical pickup of the present invention.

An integrated laser unit 10 of FIG. 26 is provided with a complex PBS 25, a configuration of which is a slight modification of that of the complex PBS 25 in the integrated laser unit 10 of FIG. 25. In the present complex PBS 25, the polarization beam splitter surface 25A has such a characteristic as to transmit substantially 100% of P polarized light and reflect substantially 100% of S polarized light with respect to the first semiconductor laser 20 of the 650 nm band and the second semiconductor laser 21 of the 780 nm band. Further, the polarization beam splitter (PBS) surface 25B has such a characteristic as to at least reflect substantially 100% of S polarized light with respect to the light of the first semiconductor laser 20 and at least transmit substantially 100% of S polarized light with respect to the light of the second semiconductor laser 21. Further, a reflector surface 25C has such a characteristic as to at least transmit substantially 100% of S polarized light at least with respect to the light of the second semiconductor laser 21.

The first hologram element 23 is formed on the transparent substrate 291. On the other hand, the 'reflective' second hologram element 241 is formed on the transparent substrate is formed on the transparent substrate 292. The transparent substrate 292 is provided on the reflector surface 25C of the complex PBS 25. The control of the hologram elements is the same as that of FIG. 25, thus attaining the same effect.

Figure 27:
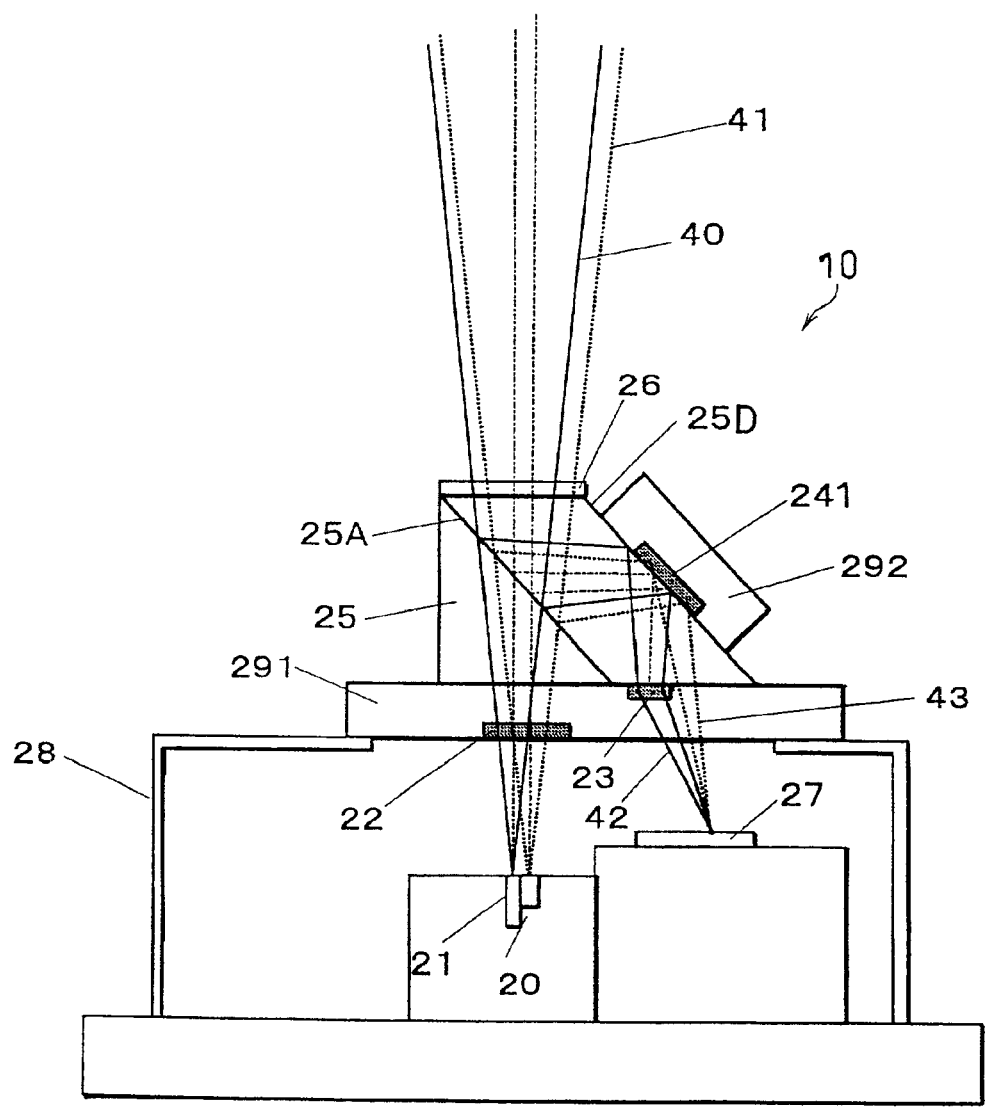
FIG. 27 is a front view showing a configuration of a seventh integrated laser unit according to the Second Embodiment of the optical pickup of the present invention.
Figure 28:
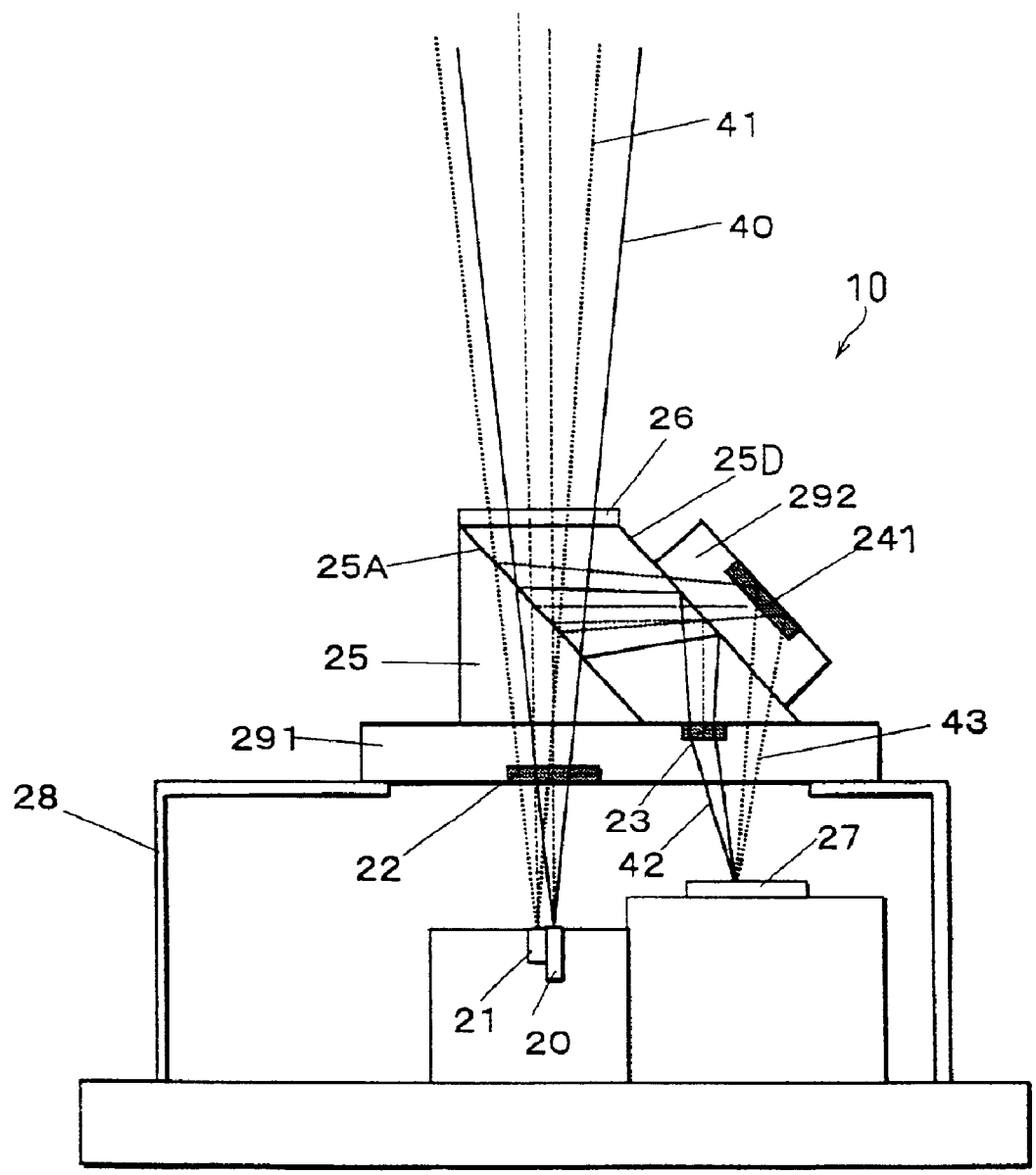
FIG. 28 is a front view showing a configuration of an eighth integrated laser unit according to the Second Embodiment of the optical pickup of the present invention.

The respective integrated laser units 10 of FIGS. 27 and 28 are provided with a complex PBS, a configuration of which is a further simplification of the configuration of the complex PBS 25 in the integrated laser unit 10 of FIG. 26. In the present complex PBS 25, a reflector surface 25D is on common ground with the PBS surface 25B and the reflector surface 25C of the complex PBS 25 shown in FIG. 26. The reflector surface 25D has such a characteristic as to reflect substantially 100% of S polarized light with respect to the first semiconductor laser 20 of the 650 nm band and transmit substantially 100% of S polarized light with respect to the second semiconductor laser 21 of the 780 nm band. The first hologram element 23 on one hand is formed on the transparent substrate 291, and the 'reflective' second hologram element 241 on the other hand is formed on the transparent substrate 292. The transparent substrate 292 is provided on the reflector surface 25D of the complex PBS 25.

In the integrated laser unit 10 of FIG. 27, the second hologram element 241 being a reflective hologram is formed on one side of the transparent substrate 292 in contact with the reflector surface 25D of the complex PBS 25. In contrast, in the integrated laser unit 10 of FIG. 28, the second hologram element 241 is formed on one side of the transparent substrate 292 opposing the side in contact with the reflector surface 25D. Compared to the configuration of FIG. 27, the configuration of FIG. 28 more easily allows spatial separation between the returning light 42 of the first semiconductor laser 20 and the returning light 43 of the second semiconductor laser 21, and allows each of the diffraction gratings of the hologram elements 23 and 241 to have a larger pitch, thereby improving mass productivity of the integrated laser unit 10.

Figure 29:
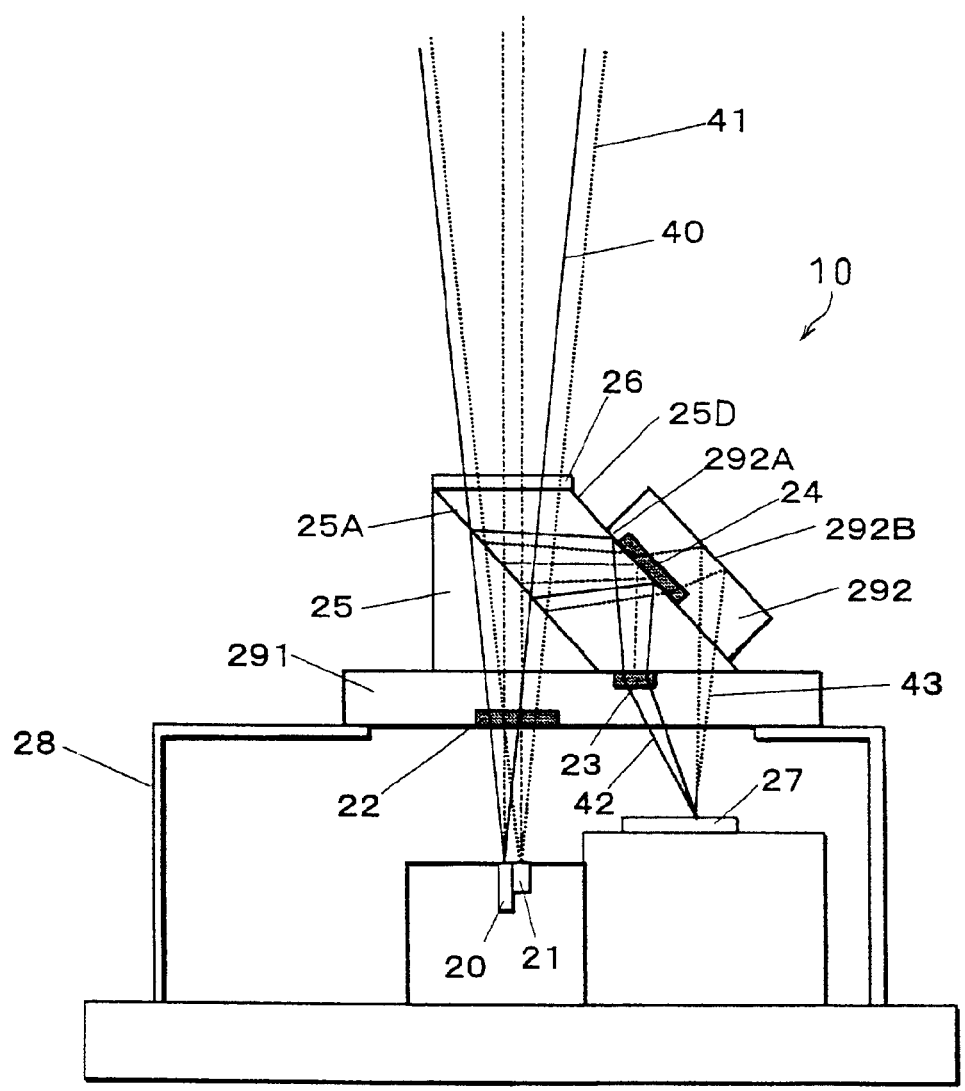
FIG. 29 is a front view showing a configuration of a ninth integrated laser unit according to the Second Embodiment of the optical pickup of the present invention.

Further, in an integrated laser unit 10 of FIG. 29, a 'transmissive' second hologram element 24 is adopted instead of the second hologram element 241 according to the configuration of FIG. 27. A reflector surface 292B of the transparent substrate 292 having the second hologram element 24 formed thereon reflects the light which was transmitted through a transmission surface 292 A of the transparent substrate 292 and diffracted at the second hologram element 24, thereafter guiding the diffracted light to the photosensor 27. With this arrangement, not only a reflective hologram but also a transmissive hologram can be adopted in combination with the simplified complex PBS 25 having the reflector 25D.

Note that, the control of the hologram elements are the same as that of FIG. 25, thus attaining the same effect.

Next, the following will describe in detail a Third Embodiment according to the present invention with reference to FIGS. 30 to 34. Note that, the same portions as those pertaining to the First Embodiment will be given the same reference symbols, and explanation thereof will be omitted here.

Figure 30:
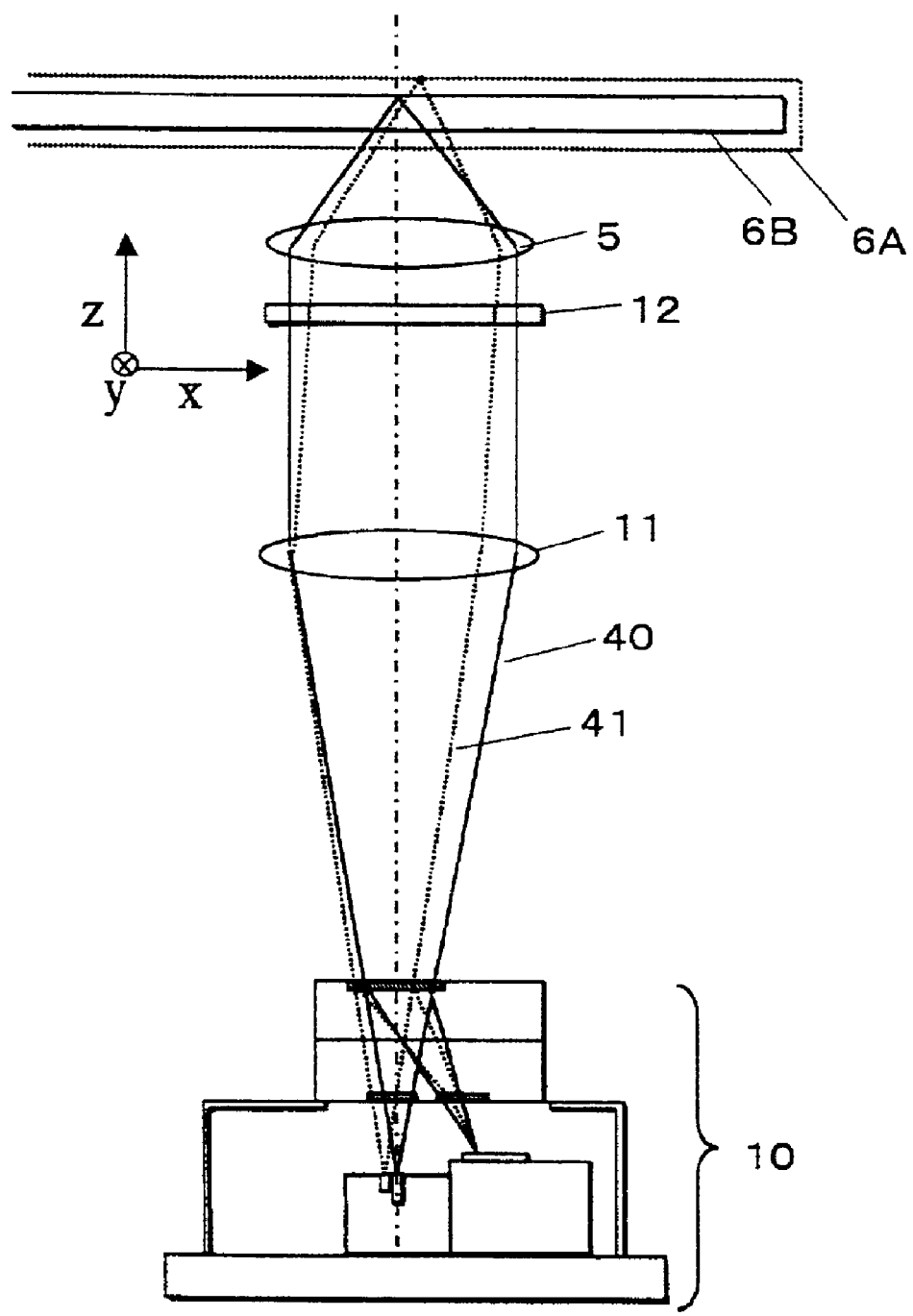
FIG. 30 is a schematic diagram showing an optical system according to a Third Embodiment of the optical pickup of the present invention.
Figure 31:
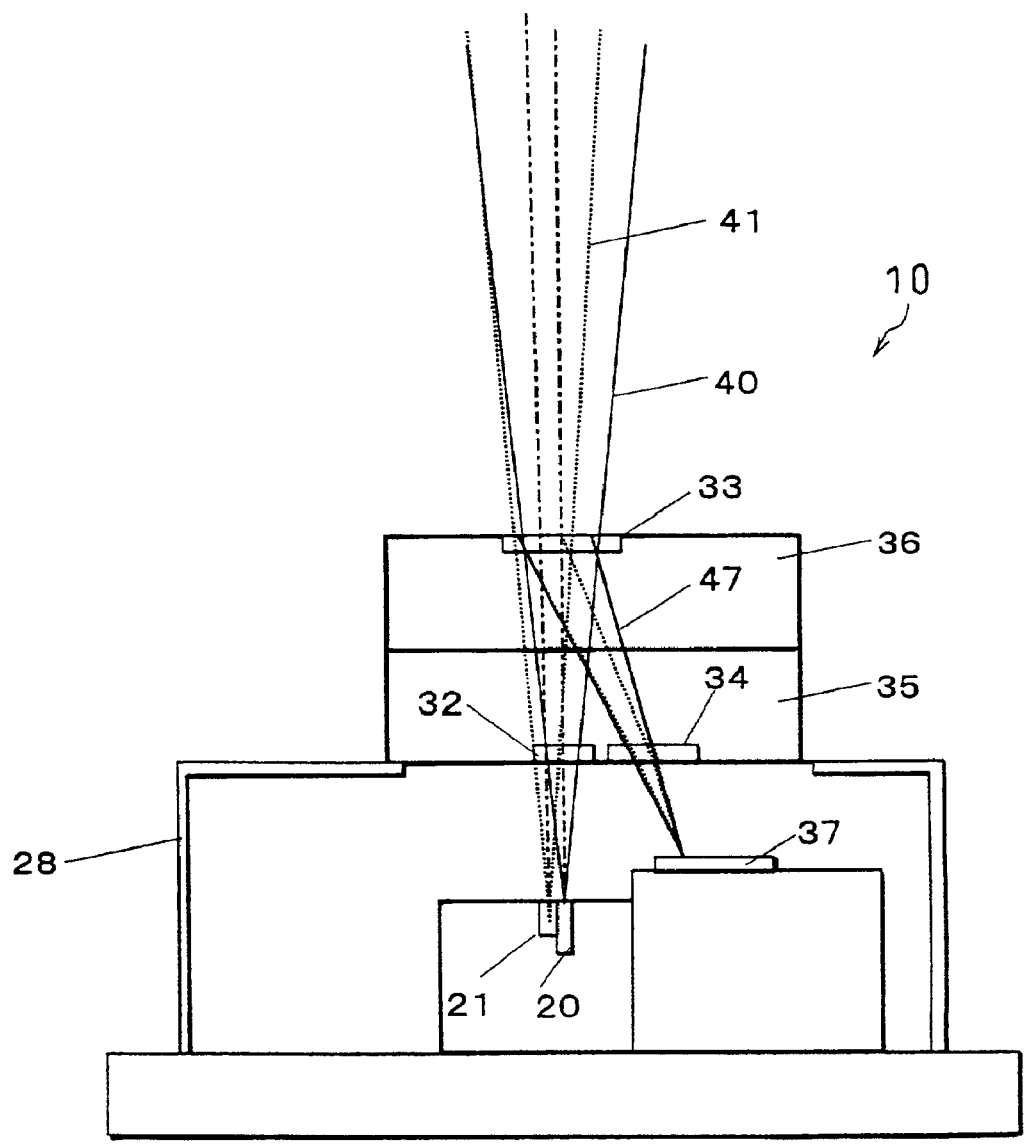
FIG. 31 is a front view showing a configuration of an integrated laser unit according to the Third Embodiment of the optical pickup of the present invention.

FIGS. 30 and 31 are schematic diagrams showing an optical pickup according to the present embodiment. The optical pickup has the same configuration as with the First Embodiment above described referring to FIG. 1 except for the configuration of the integrated laser unit 10, thereby omitting detailed explanation of the optical pickup here. The following will explain the present integrated laser unit 10 with reference to FIG. 31.

The integrated laser unit 10 according to the present embodiment is made up of a first semiconductor laser 20, a second semiconductor laser 21, a three-beam diffraction grating (wavelength selecting diffraction grating) 32, a first hologram element 33, a second hologram element 34, transparent substrates 35 and 36, and a photosensor 37.

The first semiconductor laser 20 which starts oscillating when a wavelength of laser light is in a 650 nm band and the second semiconductor laser 21 which starts oscillating when a wavelength of laser light is in a 780 nm band are adjacently disposed. The three-beam diffraction grating 32 causes emergence of three beams for tracking control. The first hologram element 33 diffracts respective light beams of the first and second semiconductor lasers 20 and 21. Further, the second hologram element 34 diffracts only a light beam of the second semiconductor laser 21 of all the light beams diffracted by the first hologram element 33, and guides the light beam to a light receiving element 37. The first hologram element 33 is formed on an upper side of the transparent substrate 36. The second hologram element 34 and the diffraction grating 32 are formed on a lower side of the transparent substrate 35.

Note that, the structures of light sources of the present optical pickup are the same as those pertaining to the First Embodiment described with reference to FIG. 3, thereby omitting explanation here.

Next, the following will explain a method for playing back different optical disks 6A and 6B. Since the method is basically the same as that of the First Embodiment, the function of the integrated laser unit 10 alone will be explained.

For example, when playing back a DVD having a plate thickness of 0.6 mm, a light beam 40 emitted from the first semiconductor laser 20 of the 650 nm band is transmitted through the diffraction grating 32, and incident on the first hologram element 33 so as to be diffracted. Of all the diffracted light, 0th order light is focused on the optical disk 6A having a plate thickness of 0.6 mm by a collimator lens 11 and an objective lens 5.

Further, the returning light is diffracted at the first hologram element 33, and transmitted through the second hologram element 34 so as to be focused on the photosensor 37.

Meanwhile, when playing back a CD having a plate thickness of 1.2 mm, a light beam 41 emitted from the second semiconductor laser element 21 of the 780 nm band is split into three beams by the diffraction grating 32, and the beams are incident on the first hologram element 33 so as to be diffracted again. Of all the diffracted light beams, 0th order light is focused on the optical disk 6B having a plate thickness of 1.2 mm by the collimator lens 11 and the objective lens 5.

Further, the returning light is diffracted at the first hologram element 33, thereafter being further diffracted at the second hologram element 34 so as to be focused on the photosensor 37. Here, the functions of a wavelength selecting aperture 12 and the three-beam diffraction grating 32 are the same as those of the wavelength selecting aperture 12 and the three-beam diffraction grating 22 of the First Embodiment.

The first hologram element 33 is set to have a groove depth which diffracts both light having the wavelength of the first semiconductor laser 20 and light having the wavelength of the second semiconductor laser 21. However, since the wavelengths are different, diffraction angles are also different with respect to the respective light beams of these wavelengths.

Figure 32:
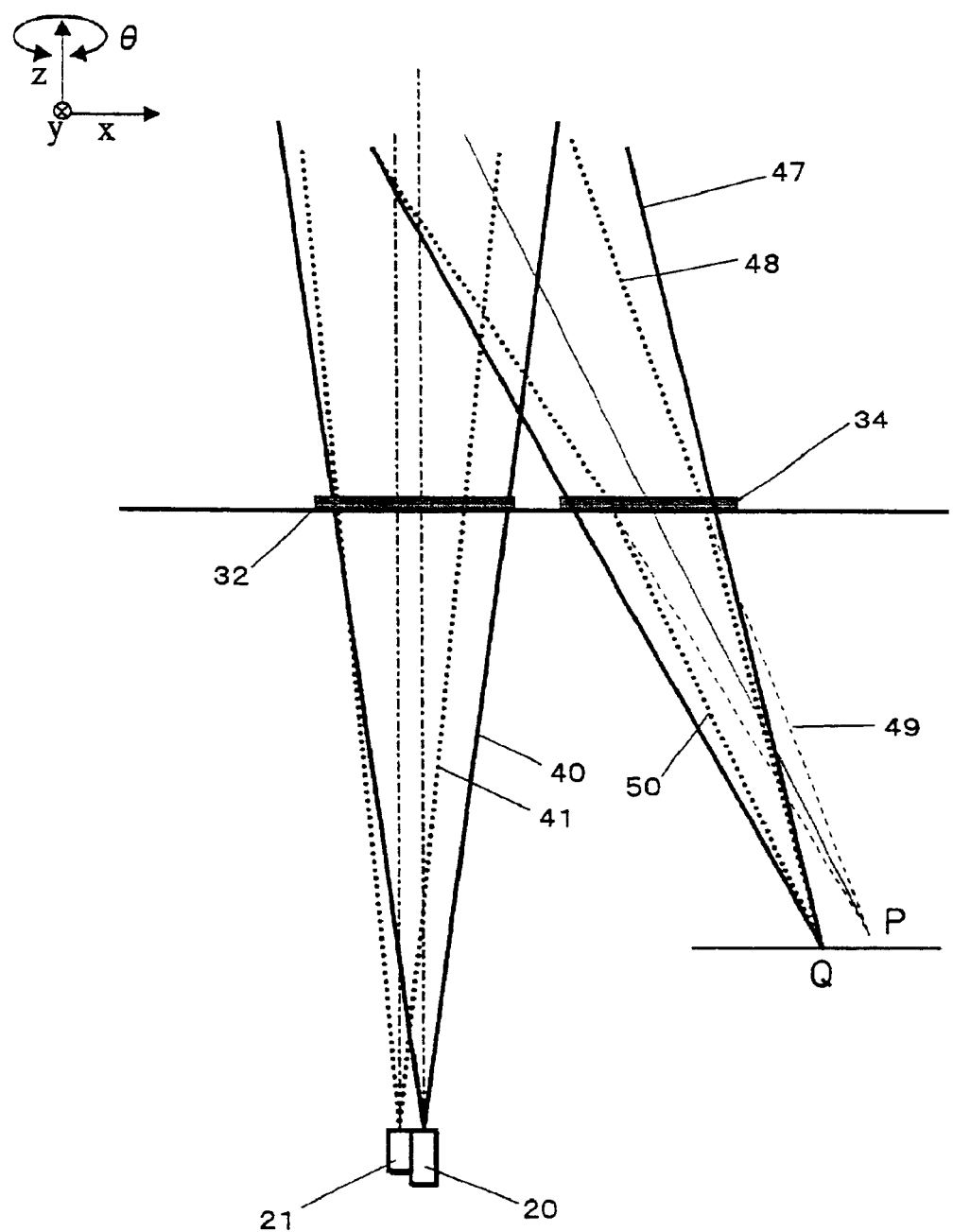
FIG. 32 is a diagram for an explanation of details of the integrated laser unit according to the Third Embodiment of the optical pickup of the present invention.

FIG. 32 shows details of diffraction light. In FIG. 32, of all the light diffracted at the first hologram element 33, numeral 47 denotes the light of the first semiconductor laser 20, and numeral 48 denotes the light of the second semiconductor laser 21. The first hologram element 33 is designed to focus the light of the first semiconductor laser 20 ideally on a point Q over the photosensor 37.

In that case, diffraction light 48 of the second semiconductor laser 21 has a larger diffraction angle than diffraction light 47. In the absence of the second hologram element 34, the diffraction light 48 follows an optical path 49, and therefore is focused on a point P which deviates from the ideal point Q over the photosensor 37.

For the shared use of the photosensor 37, focusing on the point Q is essential. Therefore, the second hologram element 34 is provided so as to focus the diffraction light 48 on the point Q by diffracting it again.

The light of the first semiconductor laser 20 is not affected because of the use of 0th order diffraction light (transmission light) of the second hologram element 34. As the second hologram element 34, alternatively, a wavelength selective hologram which does not diffract the light of the first semiconductor laser 20 may be adopted.

Figure 34:
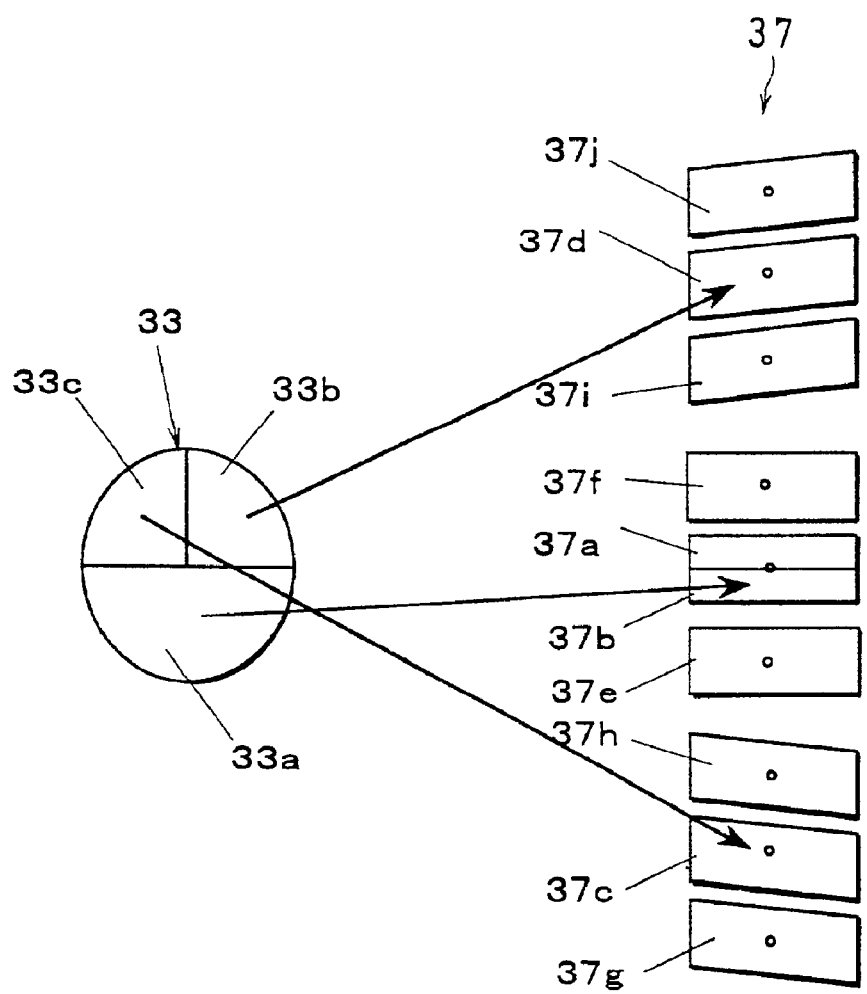
FIG. 34 is an explanatory view showing division patterns and other light converging states in the hologram element and the light receiving element.

Next, the following will explain the structures of the first hologram element 33 and the photosensor 37, and a method for detecting a servo signal. FIGS. 33 and 34 respectively show the first hologram element 33 and the forms of light receiving elements of the photosensor 37.

As shown in FIG. 33, the hologram element 33 is split into three regions 33a to 33c by a split line 33l in the x direction corresponding to the radial direction of the optical disks 6A and 6B and by a split line 33m in the y direction corresponding to the track direction.

The light receiving elements include a 2-division light receiving element which is divided into light receiving regions 37a and 37b by a division line 37l, and eight light receiving regions 37c to 37j (here, respective output form the light receiving regions are referred to as Sa to Sj).

For example, when playing a DVD back, returning light from the optical disk 6A, which was originally emitted from the first semiconductor laser 20, is incident on the first hologram element 33.

When a light beam is focused on an information recording side of the optical disk 6A by the objective lens 5, one of the incident beams diffracted at the region 33a of the first hologram element 33 is focused on the division line 37l dividing the light receiving element into the light receiving regions 37a and 37b. Likewise, light diffracted at the region 33b of the first hologram element 33 is focused on the light receiving region 37d, and light diffracted at the region 33c of the first hologram element 33 is focused on the light receiving region 37c.

As to a servo signal, as with the method explained in the First Embodiment above, a focus error signal (FES) according to the single knife edge method can be detected using Sa and Sb by FES=Sa−Sb.

Further, when playing back the optical disk 6A storing pit information, a tracking error signal 1 (TES 1) according to the phase difference (DPD) method can be detected by detecting a change in a signal phase difference between Sc and Sd.

In the case of the optical disk 6A having grooves formed therein, a tracking error signal 2 (TES 2) according to the push-pull method can be detected by TES 2=Sc−Sd.

Further, a stored information signal (RF signal) can be reproduced by RF=Sa+Sb+Sc+Sd.

Next, the following will explain the case of playing a CD back. Returning light from the optical disk 6B, which was originally emitted from the second semiconductor laser 21, is diffracted at the first hologram element 33. When the diffracted light travels as it is, the light beam is incident on the optical path 49 shown in FIG. 33.

Here, the same beam is diffracted by the second hologram element 34 so as to be incident on the light receiving element of the photosensor 37 as shown in FIG. 34. Light diffracted at the region 33a of the first hologram element 33 is focused on the division line 37l dividing the light receiving element into the light receiving regions 37a and 37b. Likewise, light diffracted at the region 33b of the first hologram element 33 is focused on the light receiving region 37d, and light diffracted at the region 33c of the first hologram element 33 is focused on the light receiving region 37c.

The light of the second semiconductor laser 21 is split into a main beam and two sub-beams A and B by the three-beam diffraction grating 32. Therefore, the sub-beams A and B diffracted at the region 33a are respectively focused on the light receiving regions 37f and 37e, and the sub-beams A and B diffracted at the region 33b of the first hologram element 33 are respectively focused on the light receiving regions 37j and 37i. Likewise, the sub-beams A and B diffracted at the region 33c of the first hologram element 33 are respectively focused on the light receiving regions 37h and 37g.

A focus error signal (FES), as with the DVD, can be detected by FES=Sa−Sb.

Further, a tracking error signal 6 (TES 6) according to the three-beam method can be detected by TES 6=(Sf+Sh+Sj)−(Se+Sg+Si).

Further, a tracking error signal 7 (TES 7) according to the differential push-pull (DPP) method can be detected by TES 7=(Sd−Sc)−k·((Sj−Sh)+(Si−Sg))

Here, a coefficient k is provided to correct a difference in light intensity between the main beam and sub-beams. Accordingly, when a ratio of intensity is the main beam:sub-beam A:sub-beam B=a:b:b, the coefficient k=a/(2b).

Further, a stored information signal (RF signal) can be reproduced by RF=Sa+Sb+Sc+Sd.

Next, the following will explain the control of the hologram elements. As with the First Embodiment above, the FES offset control will be explained. The control is the same as that of the First Embodiment in principle, explanation will be made briefly here.

First, the first semiconductor laser 20 is cased to emit light, and the returning light is diffracted at the first hologram element 33, thereafter guiding the diffracted light to the photosensor 37. With this state, in order to reduce the FES offset to zero, the transparent substrate 36 (i.e., the first hologram element 33) is controlled by rotation in the θ direction, while controlling the positions in the x and y directions so that the center of a beam and the center of a hologram coincide.

In that case, since the light 47 is only transmitted through the second hologram element 34, the position of the transparent substrate 35 is not affected.

Further, after the position of the transparent substrate 36 is fixed, the second semiconductor laser 21 is caused to emit light so as to diffract the returning light at the first hologram element 33, thereafter guiding the diffracted the light to the second hologram element 34. Since the first hologram element 33 has been optimized with respect to the first semiconductor laser 20, it may not ideally be suited to the light of the second semiconductor laser.

Accordingly, the transparent substrate 35 (i.e., the second hologram element 34) is controlled by rotation in the θ direction and by parallel shifts in the x and y directions so as to control a diffraction angle of a beam 50 shown in FIG. 32, thereby reducing the FES offset to zero.

As described, it is possible to control the positions of beams from the two semiconductor lasers 20 and 21 over the photosensor 37 independently and separately. Accordingly, an optimum servo error signal can be obtained by the control even when there are tolerances in the positional relationship between laser chips, or in the position and the angle of the laser package 28, the photosensor 37 and the hologram elements 33 and 34.

Figure 35:
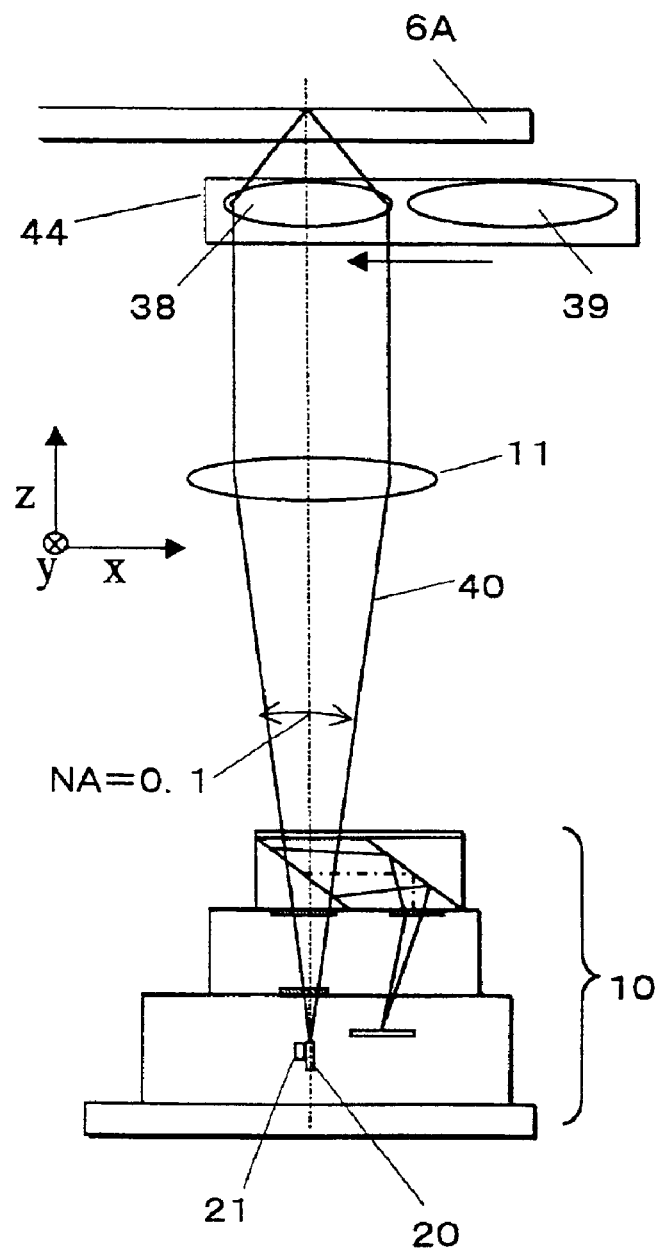
FIG. 35 is a schematic diagram showing an optical system according to a Fourth Embodiment of the optical pickup of the present invention.
Figure 36:
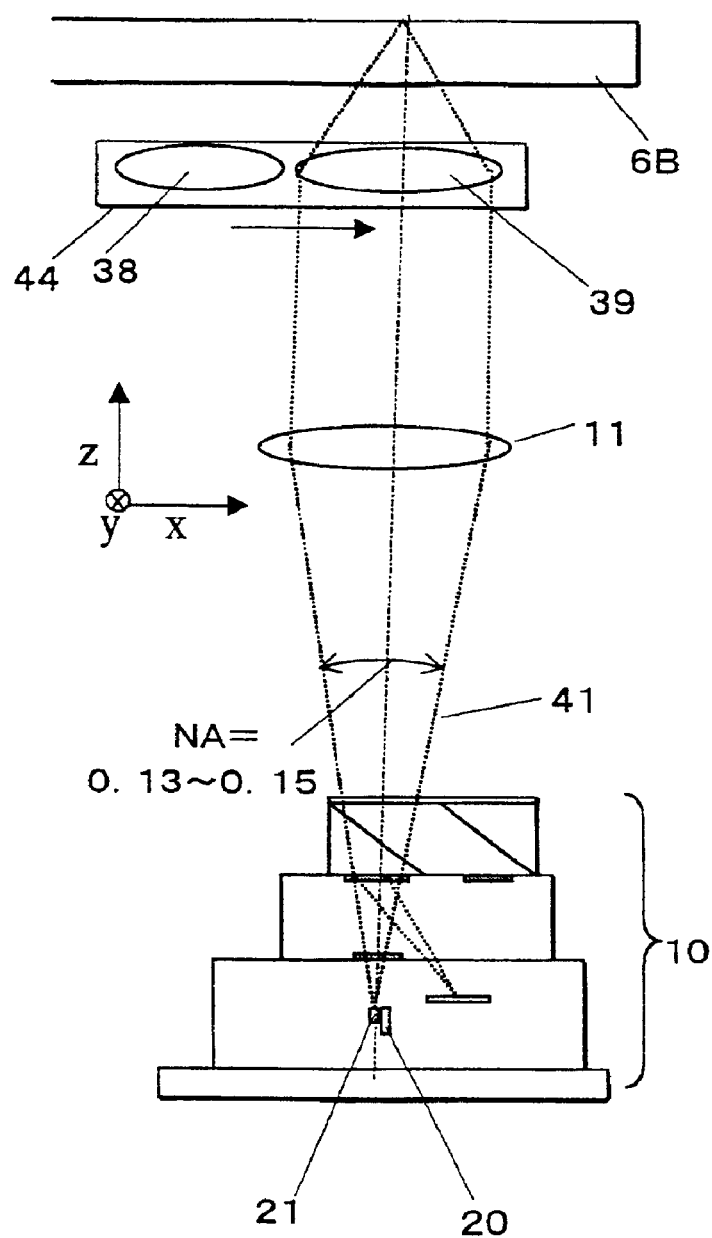
FIG. 36 is a schematic diagram showing an optical system according to the Fourth Embodiment of the optical pickup of the present invention.
Figure 37:
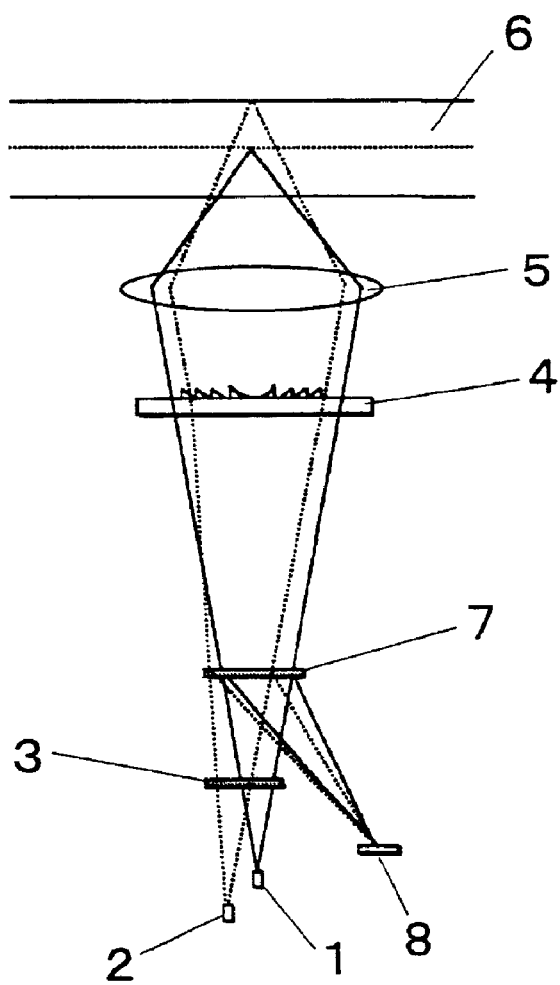
FIG. 37 is a schematic diagram showing an optical system in a conventional optical pickup.

Further, the following will explain a Fourth Embodiment according to the present invention with reference to FIGS. 35 and 36. This relates to an optical pickup adopting the integrated laser unit 10 described in the First to Third Embodiments above, and in particular a configuration to realize an optical pickup for recording and playing back CD-Rs and CD-RWs by using a high-power laser as the second semiconductor laser 21.

The detection of a servo signal can be realized, as with the first Embodiment described with reference to FIG. 15, by utilizing the DPP method for a TES. However, in an optical system shown in FIGS. 1 and 30, in order to correct a difference in disk thickness, adopted are the wavelength selecting aperture 12 and the special objective lens 5 having a partially corrected aspherical form.

In that case, for example, assuming that a NA of the collimator lens 11 is designed so as to match a DVD system having strict focusing conditions, a virtual NA of the collimator lens 11 for a CD system becomes small due to the wavelength selecting aperture 12.

Recording disks such as CD-Rs and the like require a large quantity of emission light from the objective lens. Therefore, the NA of the collimator lens 11 is made larger than an optical pickup for playback-only CD-ROMs, thereby improving utilization efficiency with respect to light from semiconductor laser light sources.

The optical pickups according to the First to Third Embodiments all adopt the integrated laser unit 10 mounting the two adjacently disposed semiconductor lasers 20 and 21 having different wavelengths. Therefore, when using an optical system of the CD system, the NA of the collimator lens 11 cannot be set flexibly.

Accordingly, in the present embodiment, as an optical pickup for recording and playing back CD-Rs and CD-RWS, configurations as shown in FIGS. 35 and 36 are adopted.

Namely, FIG. 35, as with FIG. 1, shows an optical system in the case of playing a DVD back, where light emitted from the integrated laser unit 10 is changed into parallel light by the collimator lens 11 so as to be focused on the optical disk 6A by a DVD-only objective lens 38.

The reflected light, travelling again through the same optical components in an outward travel path, is focused on a photosensor (the photosensor 27, 30, 31 or 37 described above) in the integrated laser unit 10.

On the other hand, FIG. 36 shows an optical system in the case of recording and playing back CD-Rs and CD-RWs, where, as above, light emitted from the integrated laser unit 10 is changed into parallel light by the collimator lens 11, thereafter being focused on the optical disk 6B by a CD-only objective lens 39.

The reflected light, travelling again through the same optical components in the outward travel path, is focused on the photosensor in the integrated laser unit 10.

Here, by switching between the objective lenses 38 and 39, the virtual NA of the collimator lens 11 is enlarged in the CD system. By setting an effective diameter of the CD system objective lens 39 larger than that of the DVD-only objective lens 38, it is possible to improve optical utilization efficiency in the CD system by using the shared collimator lens 11.

The switch between the objective lenses 38 and 39 is realized by using a sliding-axis type two-lens actuator 44 or the like. The virtual NA of the collimator lens is preferably set at about 0.1 in the DVD system or about 0.13 to 0.15 in the CD system.

It is also possible to switch collimator lenses by sharing an objective lens. Switch like this, however, requires to further provide a driving system in addition to the objective lens actuator. This increases costs, upsizes a pickup, and further causes adverse effects such as deviation of an optic axis, thus being unrealistic for the actual use.

In the respective optical pickup optical systems shown in FIGS. 35 and 36, explanation has been made through the case where the integrated laser unit 10 according to the First Embodiment of the present invention is mounted, though not necessarily limited to this. When using the integrated laser unit 10 according to the Second Embodiment of the present invention, for example, since a hologram element is not disposed in the middle of an outward travel path, it is possible to improve an efficiency of emission from an objective lens with respect to both light beams from the first and second semiconductor laser elements 20 and 21. Consequently, this realizes not only the recording and playback of CD-Rs and CD-RWs by the high-power second semiconductor laser 21. Namely, by additionally mounting a high-power first semiconductor laser 20, it is also possible to realize the recording and playback of DVD-Rs, DVD-RWs, DVD-RAMs and the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical pickup, comprising:
   a first light source for generating a light beam having a first wavelength;
   a second light source for generating a light beam having a second wavelength different from the first wavelength;
   a lens system for focusing the two light beams on an optical disk;
   a photosensor for sensing reflection light beams from the optical disk;
   an optical path splitting element for splitting optical paths of the two reflection light beams having different wavelengths; and
   first and second hologram elements for respectively diffracting at least one of the two light beams of the different wavelengths which were split by the optical path splitting element, and guiding the thus diffracted light to the shared photosensor, wherein one of the first and second hologram elements is disposed in an optical path being an outward travel path between the light sources and the lens system, and the other is disposed in an optical path being a return travel path between the optical path splitting element and the photosensor through which only returning light travels.

2. The optical pickup set forth in claim 1, wherein the optical path splitting element is a polarization beam splitter.

3. The optical pickup set forth in claim 2, wherein the polarization beam splitter has different polarization characteristics with respect to a light beam of the first wavelength and a light beam of the second wavelength.

4. The optical pickup set forth in claim wherein the polarization beam splitter has such characteristics as to transmit substantially full P polarized light and reflect substantially full S polarized light with respect to the light beam of the first wavelength, and transmit substantially full P and S polarized light with respect to the light beam of the second wavelength.

5. The optical pickup set forth in claim 4, further comprising a wave plate which is disposed in the optical path between the polarization beam splitter and the lens system so as to generate a ¼ wavelength phase difference with respect to the light beam of the first wavelength and an arbitrary phase difference with respect to the light beam of the second wavelength.

6. The optical pickup set forth in claim 5, wherein the wave plate is integrally and fixedly bonded to an emission side of the polarization beam splitter.

7. The optical pickup set forth in claim 2, wherein the polarization beam splitter has the same polarization characteristic with respect to the light beams of the first wavelength and the second wavelength.

8. The optical pickup set forth in claim 7, wherein the polarization beam splitter has such a characteristic as to transmit substantially full P polarized light and reflect substantially full S polarized, with respect to the light beams of the first wavelength and the second wavelength.

9. The optical pickup set forth in claim 8, further comprising a wave plate which is disposed in the optical path between the polarization beam splitter and the lens system so as to generate a ¼ wavelength phase difference with respect to the light beam of the first wavelength and a ½ wavelength phase difference with respect to the light beam of the second wavelength.

10. The optical pickup set forth in claim 2, wherein a shared 2-division light receiving element is used to detect a focus error signal according to a single knife edge method from respective semicircular beams of either of the light beams of the first wavelength and the second wavelength, the semicircular beams being split by a split line in a direction corresponding to a direction of the radius of the optical disk.

11. The optical pickup set forth in claim 10, wherein a direction of the division line of the 2-division light receiving element is set so that, in a focus error signal due to the light beam of the first wavelength diffracted by the first hologram element and a focus error signal due to the light beam of the second wavelength diffracted by the second hologram element, an offset resulted from variations in wavelength of the first and second light sources is cancelled.

12. The optical pickup set forth in claim 10, wherein a position of the division line of the 2-division light receiving element is set so that, in a focus error signal due to the light beam of the first wavelength diffracted by the first hologram element and a focus error signal due to the light beam of the second wavelength diffracted by the second hologram element, an offset resulted from variations in wavelength of the first and second light sources is cancelled.

13. The optical pickup set forth in claim 2, wherein: the first hologram element is used to detect a tracking error signal according to a phase difference method or a push-pull method, and the second hologram element is used to detect a tracking error signal according to a three-beam method or a differential push-pull method.

14. The optical pickup set forth in claim 2, wherein the photosensor is disposed lest diffraction light of the light beam of the second wavelength from the first hologram element and diffraction light of the light beam of the first wavelength from the second hologram element should enter the photosensor.

15. The optical pickup set forth in claim 2, further comprising a wavelength selecting diffraction grating for transmitting the substantially full light beam of the first wavelength and splitting the light beam of the second wavelength into three beams including 0th order light and ±1st order light, the wavelength selecting diffraction grating being disposed between the first and second light sources and the second hologram element.

16. The optical pickup set forth in claim 1, wherein: the first hologram element is set to have a groove depth such that ±1st order diffraction efficiency is largest with respect to a light beam of the first wavelength, and the second hologram element is set to have a groove depth such that a product of ±1st order diffraction efficiency and 0th order diffraction efficiency is largest with respect to a light beam of the second wavelength.

17. The optical pickup set forth in claim 1, where the first light source is a semiconductor laser of a 650 nm band, and the second light source is a semiconductor laser of a 780 nm band.

18. The optical pickup set forth in claim 1, further comprising two objective lenses having different effective diameters respectively corresponding to the first and second light sources.

19. An optical pickup, comprising:
a first light source for generating a light beam having a first wavelength;
a second light source for generating a light beam having a second wavelength different from the first wavelength;
a lens system for focusing the two light beams on an optical disk;
a photosensor for sensing reflection light beams from the optical disk;
an optical path splitting element for splitting optical paths of the two reflection light beams having different wavelengths; and
first and second hologram elements for respectively diffracting at least one of the two light beams of the different wavelengths which were split by the optical path splitting element, and guiding the thus diffracted light to the shared photosensor, wherein the optical path splitting element and at least one of the first and second hologram elements are separately provided so that a position of either of the two reflecting light beams can independently be controlled over the photosensor by separately controlling each of the elements, wherein one of the first and second hologram elements is disposed in an optical path being an outward travel path between the light sources and the lens system, and the other is disposed in an optical path being a return travel path between the optical oath splitting element and the photosensor through which only returning light travels.

20. The optical pickup set forth in claim 19, wherein the optical path splitting element is a polarization beam splitter.

21. The optical pickup set forth in claim 20, wherein the polarization beam splitter has different polarization characteristics with respect to a light beam of the first wavelength and a light beam of the second wavelength.

22. The optical pickup set forth in claim 20, wherein the polarization beam splitter has such characteristics as to transmit substantially full P polarized light and reflect substantially full S polarized light with respect to the light beam of the first wavelength, and transmit substantially full P and S polarized light with respect to the light beam of the second wavelength.

23. The optical pickup set forth in claim 22, further comprising a wave plate which is disposed in the optical path between the polarization beam splitter and the lens system so as to generate a ¼ wavelength phase difference with respect to the light beam of the first wavelength and an arbitrary phase difference with respect to the light beam of the second wavelength.

24. The optical pickup set forth in claim 20, wherein the polarization beam splitter has the same polarization characteristic with respect to the light beams of the first wavelength and the second wavelength.

25. The optical pickup set forth in claim 24, wherein the polarization beam splitter has such a characteristic as to transmit substantially full P polarized light and reflect substantially full S polarized, with respect to the light beams of the first wavelength and the second wavelength.

26. The optical pickup set forth in claim 25, further comprising a wave plate which is disposed in the optical path between the polarization beam splitter and the lens system so as to generate a ¼ wavelength phase difference with respect to the light beam of the first wavelength and a ½ wavelength phase difference with respect to the light beam of the second wavelength.

27. The optical pickup set forth in claim 26, wherein the wave plate is integrally and fixedly bonded to an emission side of the polarization beam splitter.

28. The optical pickup set forth in claim 20, wherein a shared 2-division light receiving element is used to detect a focus error signal according to a single knife edge method from respective semicircular beams of either of the light beams of the first wavelength and the second wavelength, the semicircular beams being split by a split line in a direction corresponding to a direction of the radius of the optical disk.

29. The optical pickup set forth in claim 28, wherein a direction of the division line of the 2-division light receiving element is set so that, in a focus error signal due to the light beam of the first wavelength diffracted by the first hologram element and a focus error signal due to the light beam of the second wavelength diffracted by the second hologram element, an offset resulted from variations in wavelength of the first and second light sources is cancelled.

30. The optical pickup set forth in claim 28, wherein a position of the division line of the 2-division light receiving element is set so that, in a focus error signal due to the light beam of the first wavelength diffracted by the first hologram element and a focus error signal due to the light beam of the second wavelength diffracted by the second hologram element, an offset resulted from variations in wavelength of the first and second light sources is cancelled.

31. The optical pickup set forth in claim 20, wherein: the first hologram element is used to detect a tracking error signal according to a phase difference method or a push-pull method, and the second hologram element is used to detect a tracking error signal according to a three-beam method or a differential push-pull method.

32. The optical pickup set forth in claim 20, wherein the photosensor is disposed lest diffraction light of the light beam of the second wavelength from the first hologram element and diffraction light of the light beam of the first wavelength from the second hologram element should enter the photosensor.

33. The optical pickup set forth in claim 20, further comprising a wavelength selecting diffraction grating for transmitting the substantially full light beam of the first wavelength and splitting the light beam of the second wavelength into three beams including 0th order light and ±1st order light, the wavelength selecting diffraction grating being disposed between the first and second light sources and the second hologram element.

34. The optical pickup set forth in claim 19, wherein: the first hologram element is set to have a groove depth such that ±1st order diffraction efficiency is largest with respect to a light beam of the first wavelength, and the second hologram element is set to have a groove depth such that a product of ±1st order diffraction efficiency and 0th order diffraction efficiency is largest with respect to a light beam of the second wavelength.

35. The optical pickup set forth in claim 19, where the first light source is a semiconductor laser of a 650 nm band, and the second light source is a semiconductor laser of a 780 nm band.

36. The optical pickup set forth in claim 35, wherein at least one of the first and second light sources is a high-power laser so as to enable recording and playback with respect to the optical disk.

37. The optical pickup set forth in claim 19, further comprising two objective lenses having different effective diameters respectively corresponding to the first and second light sources.

* * * * *

UNITED STATES PATENT AND TRADEMARK OFFICE
CERTIFICATE OF CORRECTION

PATENT NO. : 6,868,055 B2
APPLICATION NO. : 09/907880
DATED : March 15, 2005
INVENTOR(S) : Tetsuo Ueyama et al.

It is certified that error appears in the above-identified patent and that said Letters Patent is hereby corrected as shown below:

In claim 4, line 1 (column 28, line 64), please change "The optical pickup set forth in claim wherein" to --The optical pickup set forth in claim 2, wherein--.

Signed and Sealed this

Seventh Day of August, 2007

JON W. DUDAS
*Director of the United States Patent and Trademark Office*